Fig. 2

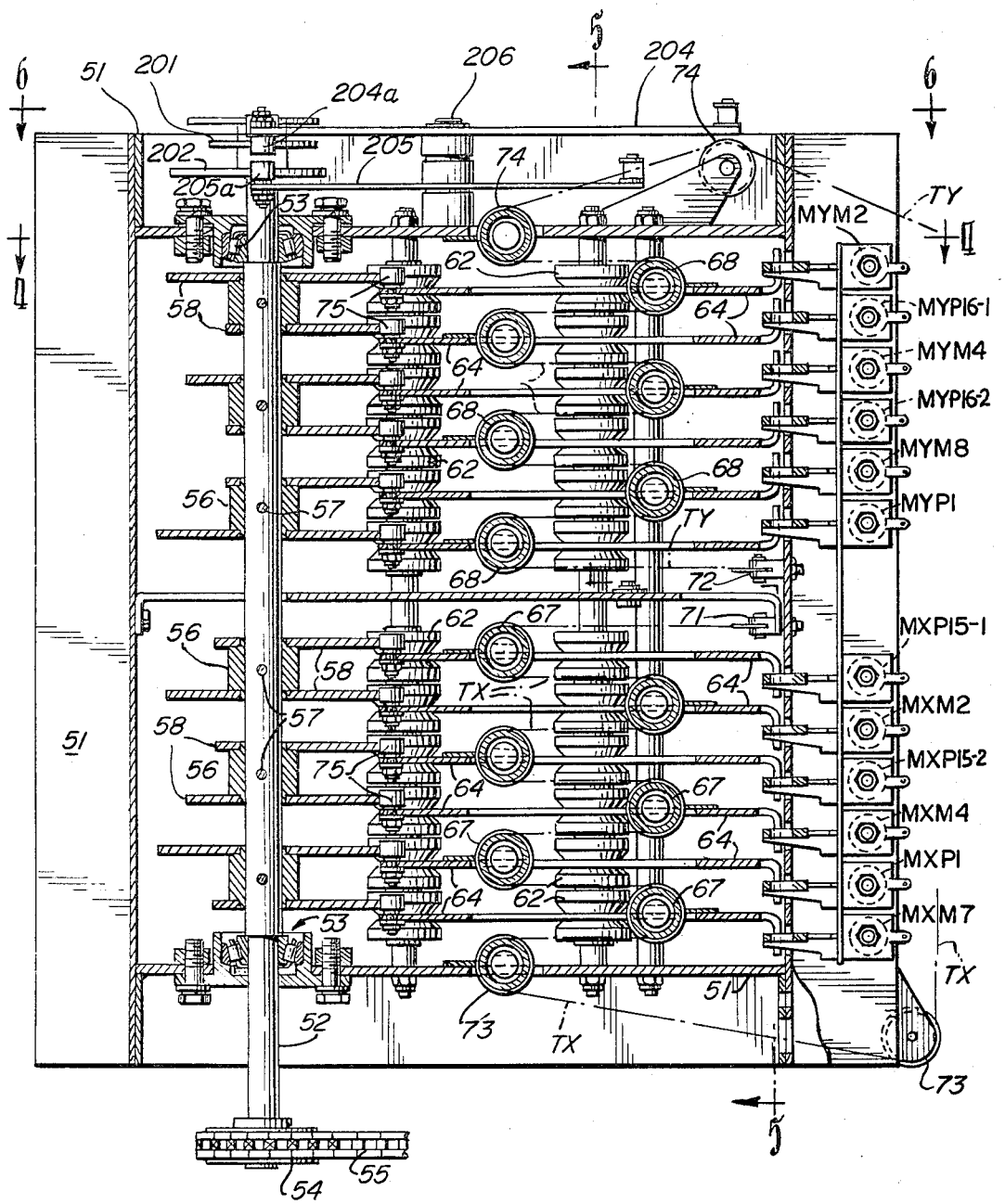

May 28, 1968  P. R. HOFFMAN  3,385,210
PRINTER AND DIFFERENTIAL PRINT HEAD DRIVE MEANS
FOR PRINTING BOWLING SCORES AND THE LIKE
Filed Oct. 14, 1965  12 Sheets-Sheet 4
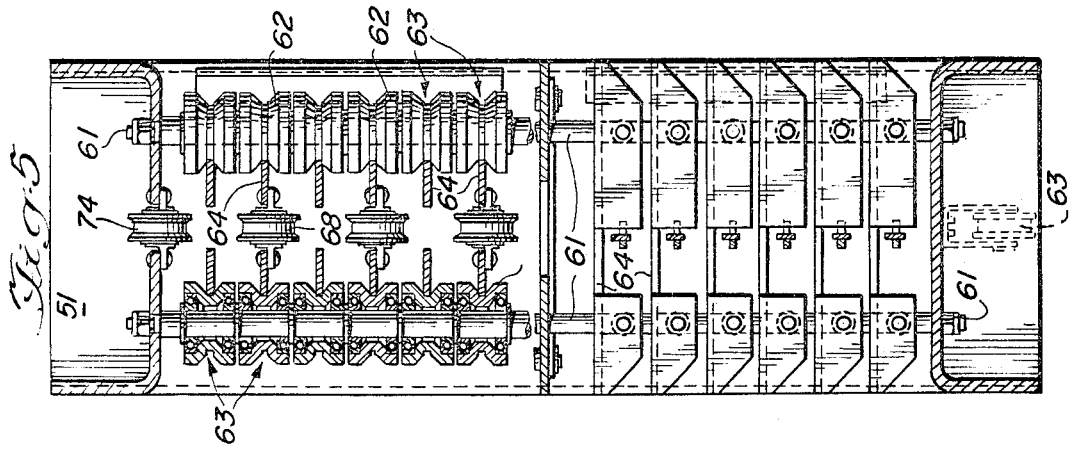
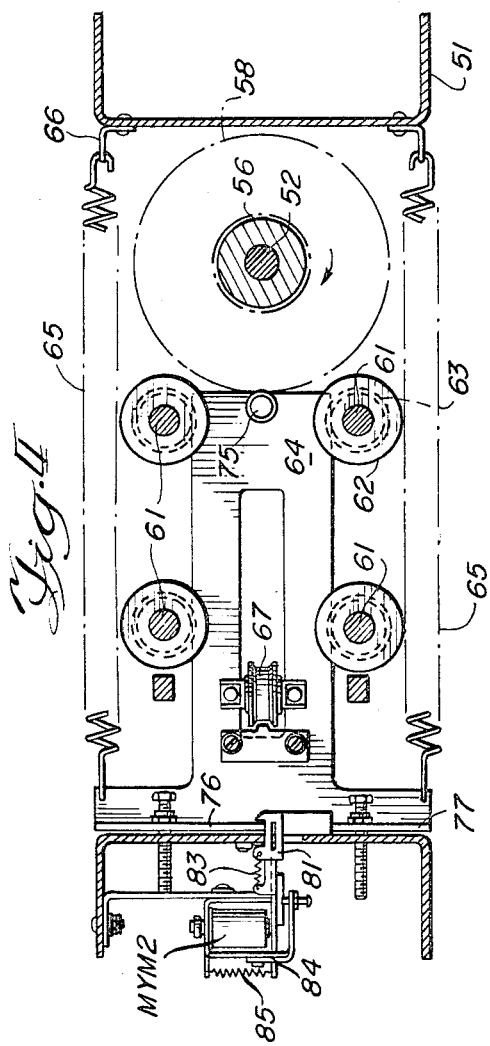
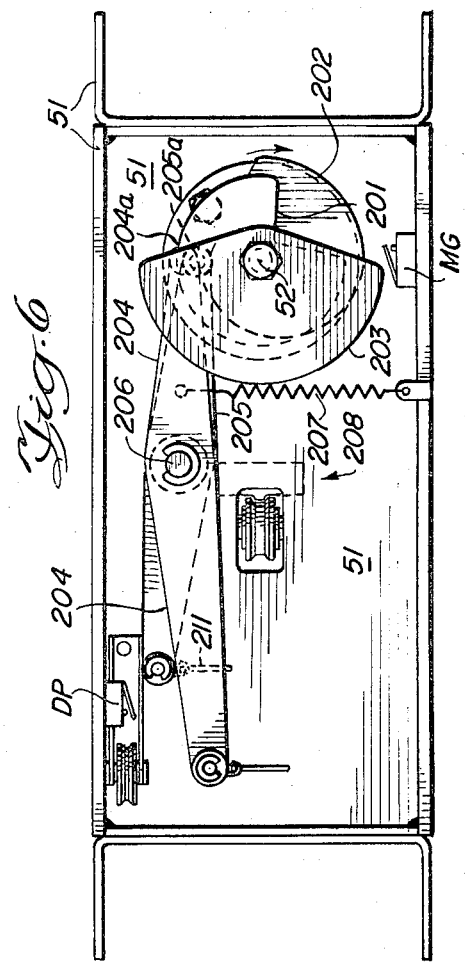

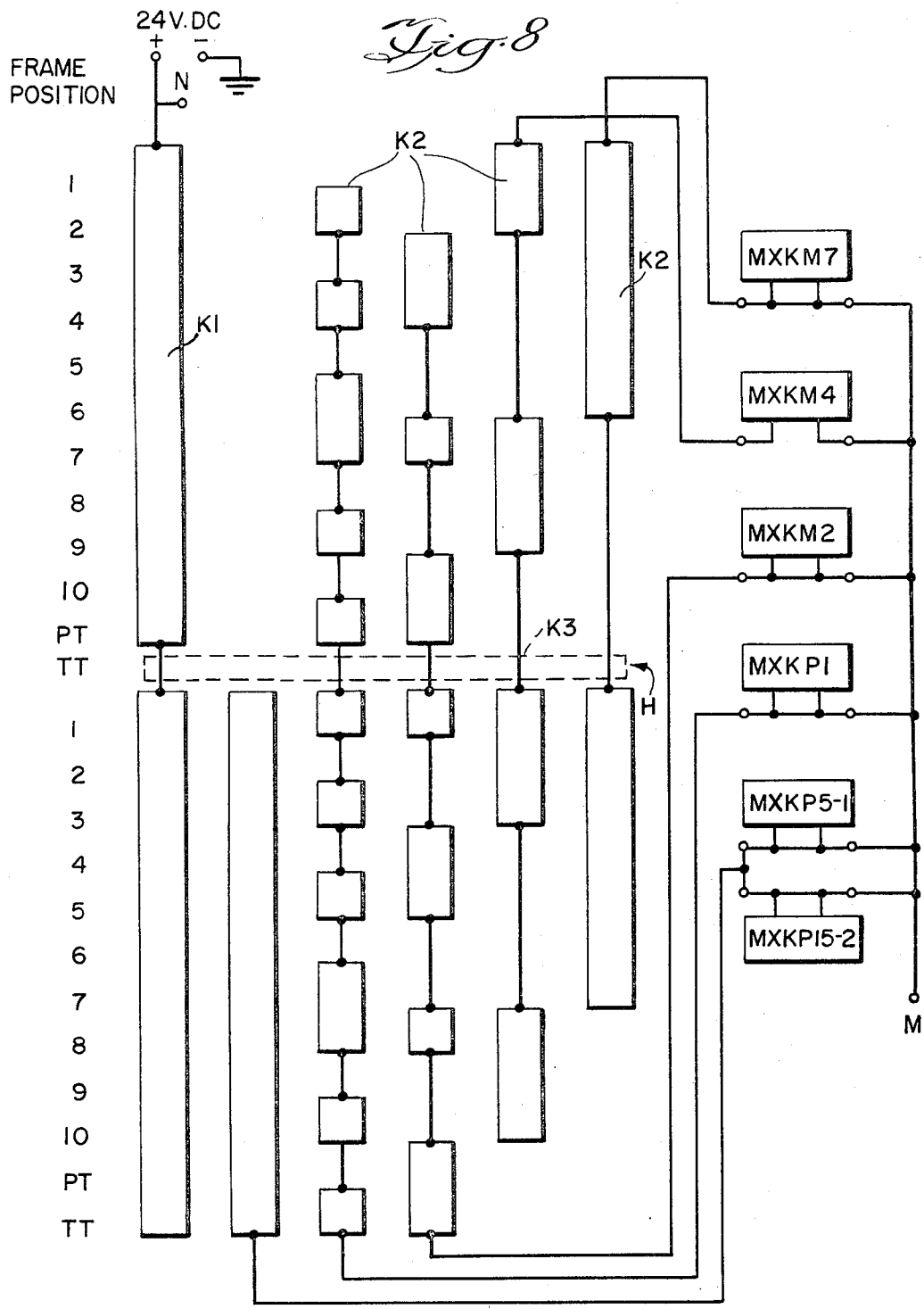

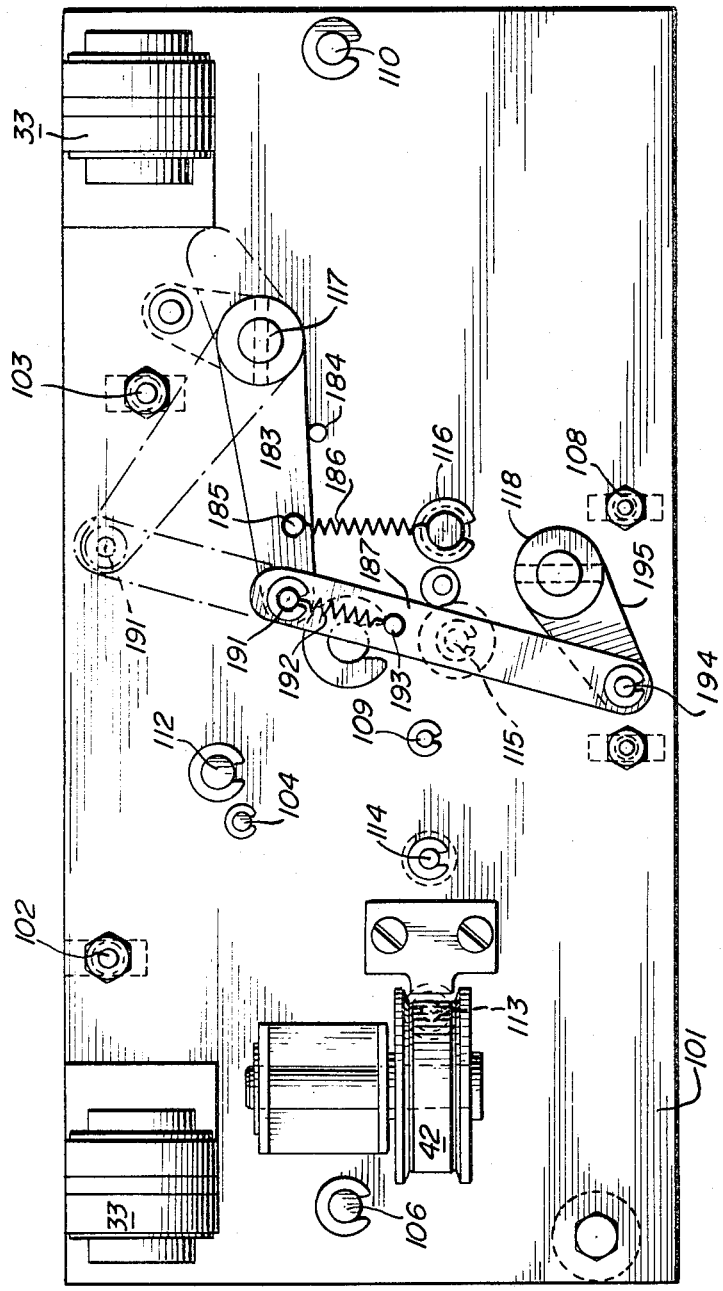

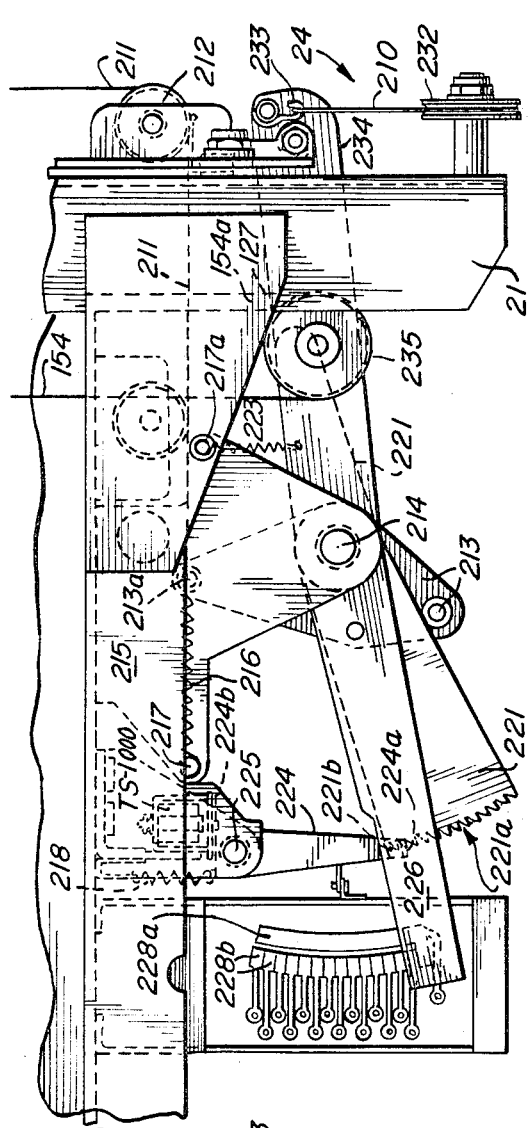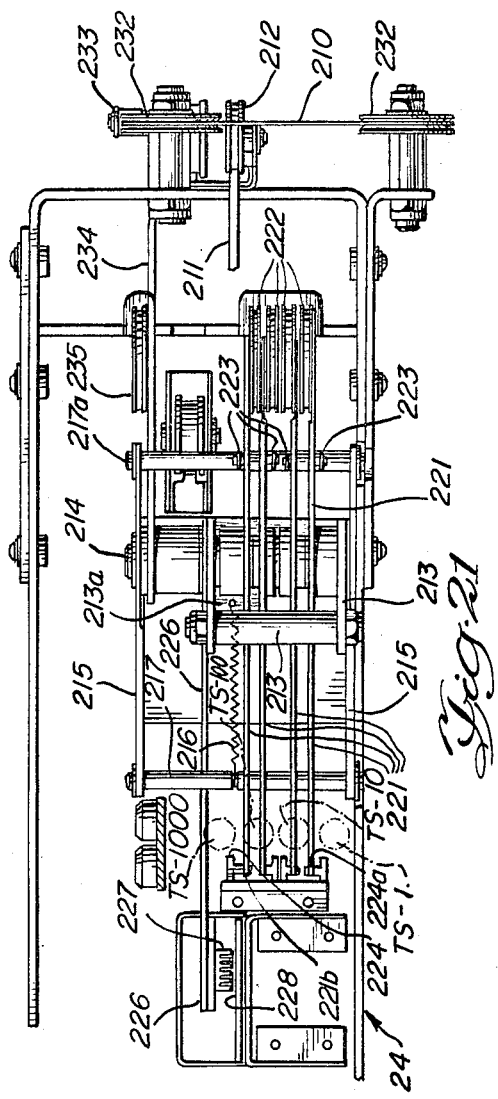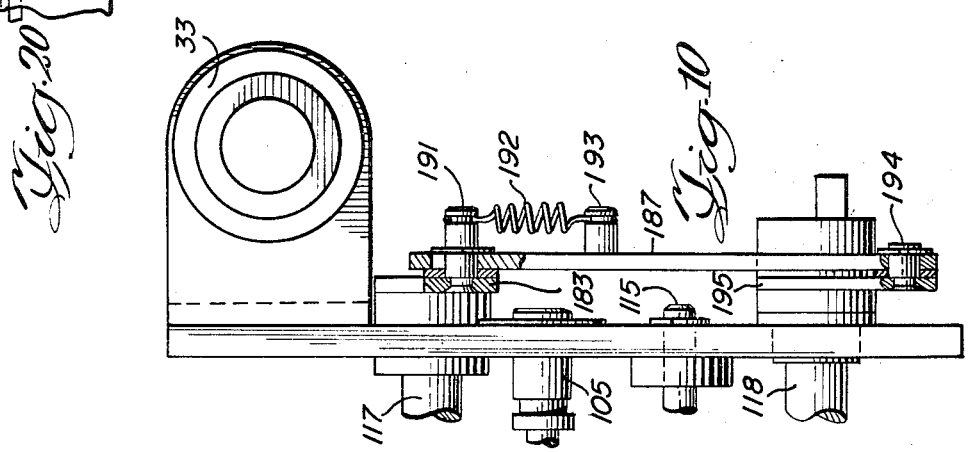

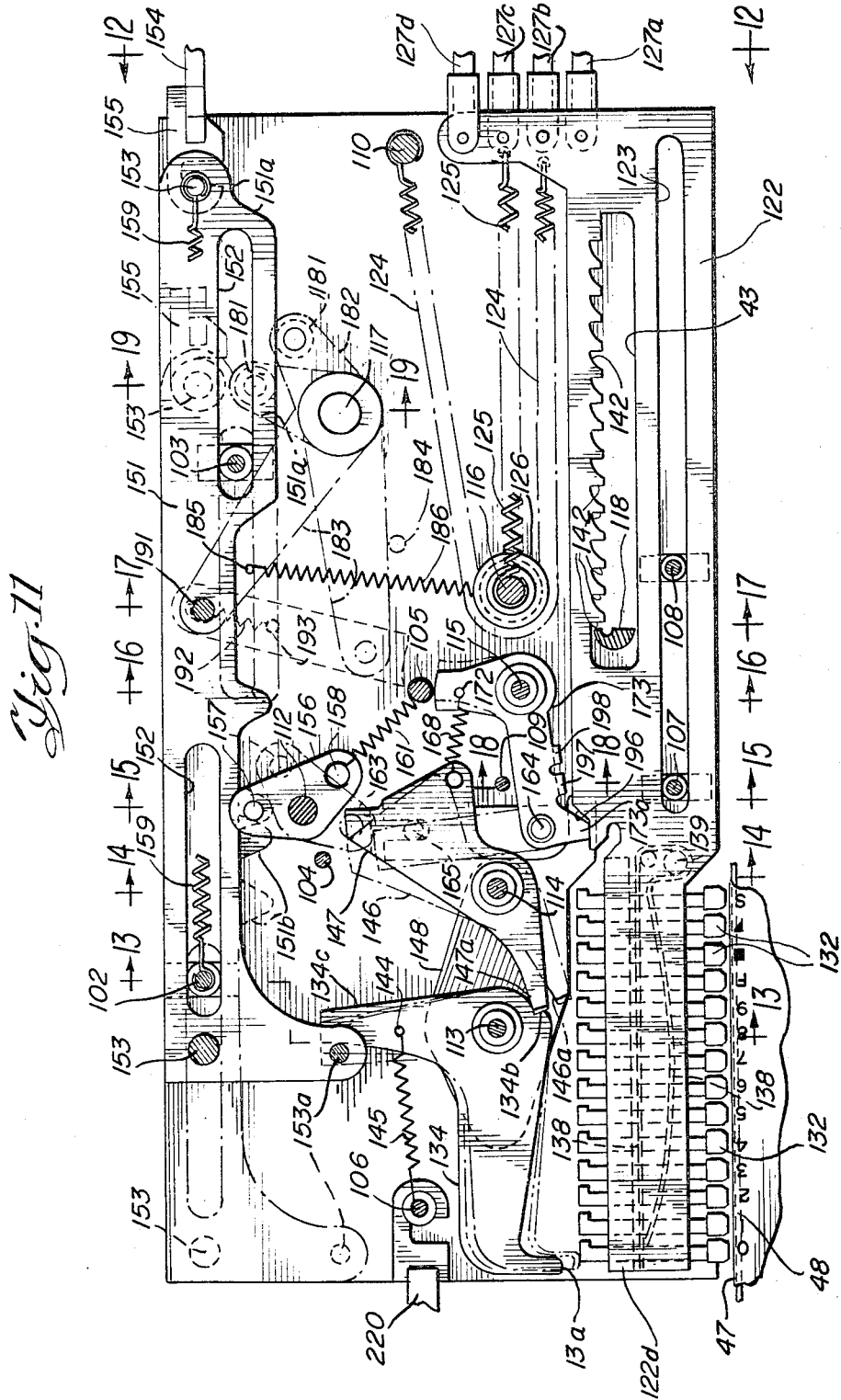

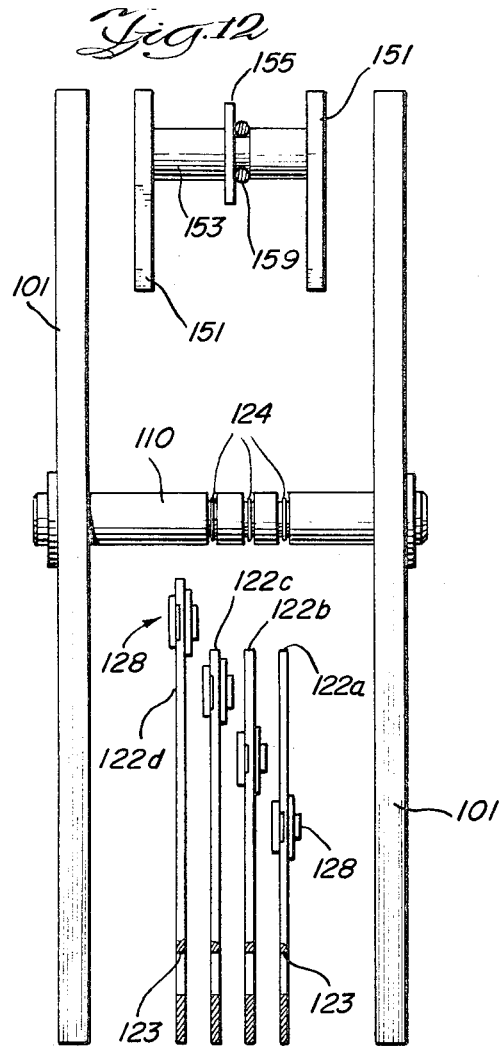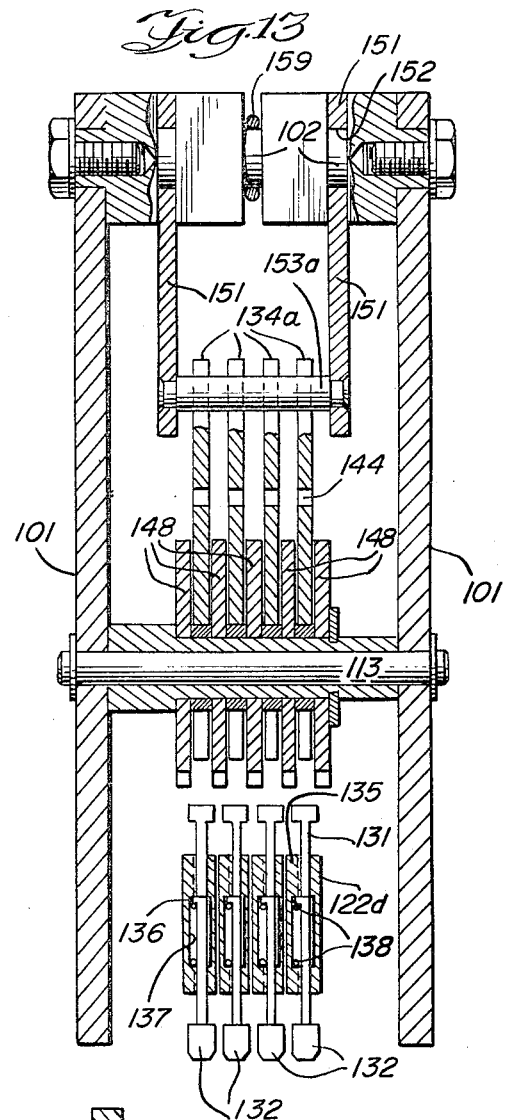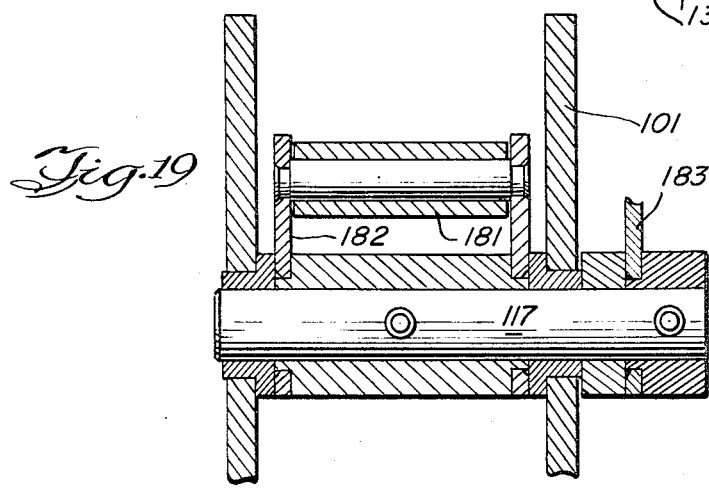

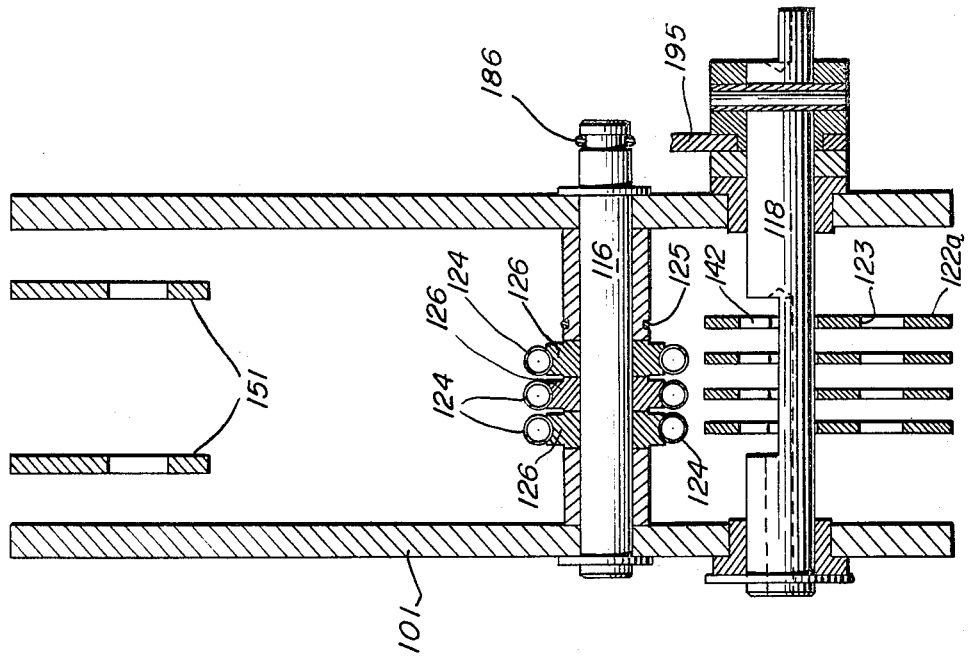
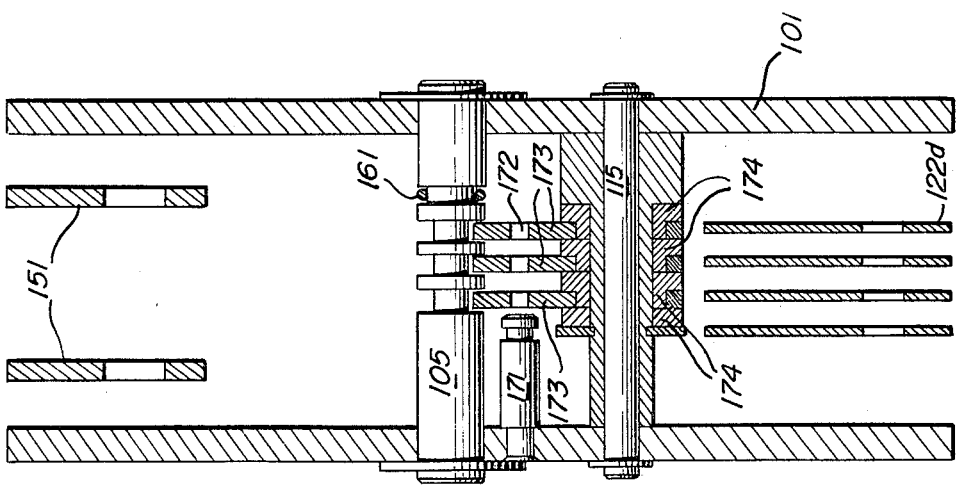

United States Patent Office 3,385,210
Patented May 28, 1968

3,385,210
PRINTER AND DIFFERENTIAL PRINT HEAD
DRIVE MEANS FOR PRINTING BOWLING
SCORES AND THE LIKE
Paul R. Hoffman, Grand Haven, Mich., assignor to Brunswick Corporation, a corporation of Delaware
Filed Oct. 14, 1965, Ser. No. 495,776
22 Claims. (Cl. 101—93)

ABSTRACT OF THE DISCLOSURE

A printing system for printing bowling scores on a four-team score card wherein a printing head is moved parallel to the score card concurrently in the direction of two perpendicular axes along a vector of the axes in either direction from a central home position by a tape-driven differential, and type is set in the printing head by tape driven with the differential input to position the type and printer for proper printing of each bowler's score responsive to information received and held by the printer.

---

This invention relates to a system for printing bowling scores and the like and more particularly relates to such a system which utilizes a print head mechanism mounted for movement relative to a scoresheet, the control of the relative movement of the print head and scoresheet, and the control of a printing operation so that a score value can be entered on the scoresheet in the proper place during a bowling game.

In recent years, systems for automatic scoring of bowling games have been under development. Such systems usually receive pinfall information either from a pin detection system or a manual input, calculate bowling scores, and award the ball scores to the proper bowler. Many such systems also provide a visual read-out in the form of a printed scoresheet which may also be projected to a viewing screen. The present invention is concerned with a system which is capable of receiving bowling score information and information as to the proper space on a scoresheet in which the score information is to be entered or printed, and is also capable of effecting the printing operation.

Although systems have been provided heretofore which print responsive to controls of a scoring system, the printing operation is often slow or time consuming and also ties up the scoring system controls during the time required for printing. In addition, it is desirable to improve various components of the printing system for better or faster operation.

A general object of this invention is to provide a new and useful printing system for printing bowling scores, which system is capable of accepting and storing such information required for proper printing as (1) frame information, (2) bowler identification, (3) information as to whether box score is to be printed or cumulative frame score is to be printed and/or (4) the actual score value to be printed, so that the printer can be disconnected from or release the source of supply of this information, e.g. the controls of a scoring system, and can complete the proper printing operation from the stored information.

Another general object of this invention is to provide a new and useful bowling score printing system in which a print head and scoresheet support surface are mounted for relative movement along both X and Y axes and in which a drive system produces concurrent movement along both axes.

Another object is to provide a system according to the foregoing object in which differential tape means are used to drive the print head relative to the scoresheet support surface along both axes.

Yet another object is to provide such a system in which the differential tape means includes separate differential means for driving the print head along each axis and wherein each separate differential means includes a plurality of inputs and a common output so that the inputs can be actuated to provide differential positioning of the print head over the scoresheet.

Another general object of this invention is to provide a new and useful printing system for printing bowling scores in which a print head and scoresheet support surface are mounted for relative movement in either of two opposite directions along both X and Y axes from a normal home position, usually toward the center of a scoresheet supported by the support surface.

Yet another object of this invention is to provide a new and useful print head in a bowling score printing system.

A more particular object is to provide a new and useful hammer actuating slide system having a reciprocal stroke and which can be driven through the stroke for tripping and thereafter resetting a print hammer, thereby effecting a print operation and readying the print hammer for the next print operation.

Still another object is to provide a new and useful detent system for holding printing type during a printing operation.

Another object of this invention is to provide a new and useful zero suppression system for suppressing the printing of zeros by the print head of any of the foregoing objects during a printing operation where zeros are not desired.

A still further object of this invention is to provide a common drive for actuating a type adjusting system for adjusting type in a print head, the positioning of the print head relative to a scoresheet support surface, and the print hammers, all in timed relation, to effect a complete print cycle from the common drive.

Other objects will be apparent from the following description and the drawings in which:

FIG. 2 is an illustration of a scoresheet for accommodating scores of four teams of players which can be used by the device of FIG. 1 to provide a record of bowling scores during a bowling game bowled by each member of each team;

FIG. 3 is a section through a print head positioning and print hammer actuating control portion of the device of FIG. 1;

FIG. 4 is a section along line 4—4 in FIG. 3;

FIG. 5 is a section along line 5—5 in FIG. 3;

FIG. 6 is an end view from along line 6—6 in FIG. 3;

FIG. 8 is another portion of the wiring diagram intended to be connected to the portion of FIG. 7 through the terminals "M" and the terminals "N" of the two portions;

FIG. 9 is a side plan view of a print head in the device of FIG. 1;

FIG. 10 is a broken view from the left end of FIG. 9;

FIG. 11 is a section taken beneath the outer housing of the print head of FIG. 9;

FIG. 12 is a view from the right end of FIG. 11, along line 12—12;

FIG. 13 is a section through the print head along line 13—13 in FIG. 11;

FIG. 16 is a section along line 16—16 in FIG. 11;

FIG. 17 is a section along line 17—17 in FIG. 11;

FIG. 19 is a section along line 19—19 in FIG. 11;

FIG. 20 is a top plan view of a print head operating mechanism 24 in the device of FIG. 1; and FIG. 21 is a side plan view of the mechanism of FIG. 20.

Figure 1:
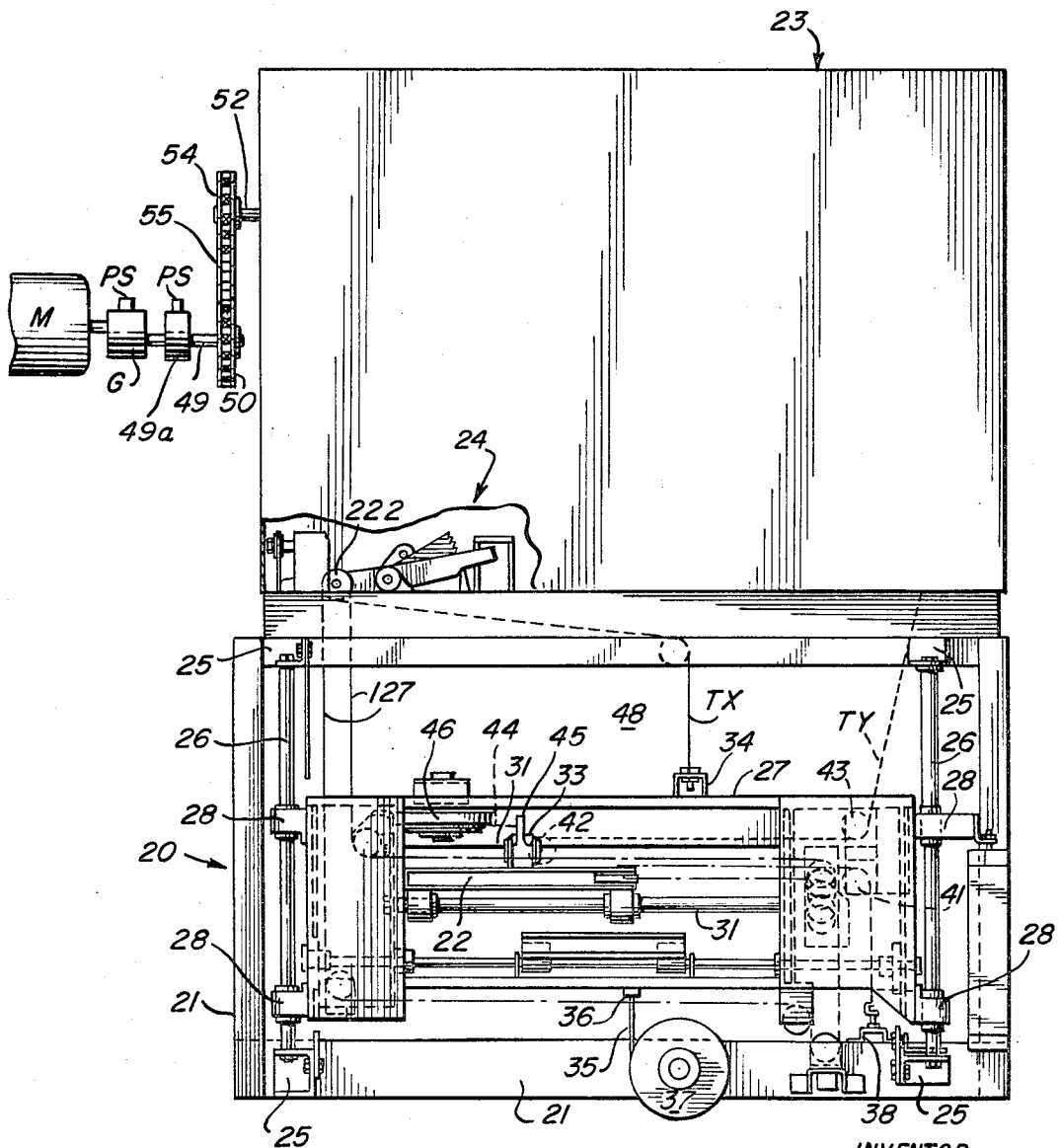
FIG. 1 is a top plan view of an embodiment of the printer and control system of this invention, showing the layout of a print head positioning carriage system in detail.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

The present printing system can be used to print scores on a scoresheet from information transmitted to the printing system. The printing system is capable of receiving such information from a computation and control system of a bowling scorer such as that provided by Cornell et al. in application Ser. No. 366,297, entitled "Automatic Bowling Scorer," filed on May 11, 1964, and assigned to the common assignee of this application. The Cornell et al. scoring system, for example, receives pinfall information resulting from a multiplicity of bowlers bowling on a plurality of lanes, converts the information to bowling scores and awards the scores to the proper bowlers. Reference may be had to the Cornell et al. application for specific construction of a suitable basic scoring system and attentive equipment. Also, because the printing system illustrated herein is specifically disclosed as accommodating or servicing bowlers on four teams, who would normally bowl on four adjacent lanes, i.e. one lane pair for each pair of teams, reference may also be made to Hoffman et al. application Ser. No. 498,456 wherein there is described a scoring system expanded to readily accommodate four lanes or two lane pairs.

The computation and control unit in the above mentioned scoring system also functions to transmit information to and/or control a printing system for readout of score information on a scoresheet on a ball-by-ball basis to print box scores after the bowling of each ball and frame scores after the completion of each frame.

In accordance with the present invention, there is provided a new and useful printing system for receiving information from, and for control by, a scoring system. The printing system prints during a print cycle which can be initiated by the scoring system, receives information as to bowler identity and frame identity, orients to the proper printing position relative to a scoresheet and prints score information received from the scoring system in the proper area of the scoresheet in accordance with the normal score entry procedures.

Figure 2:
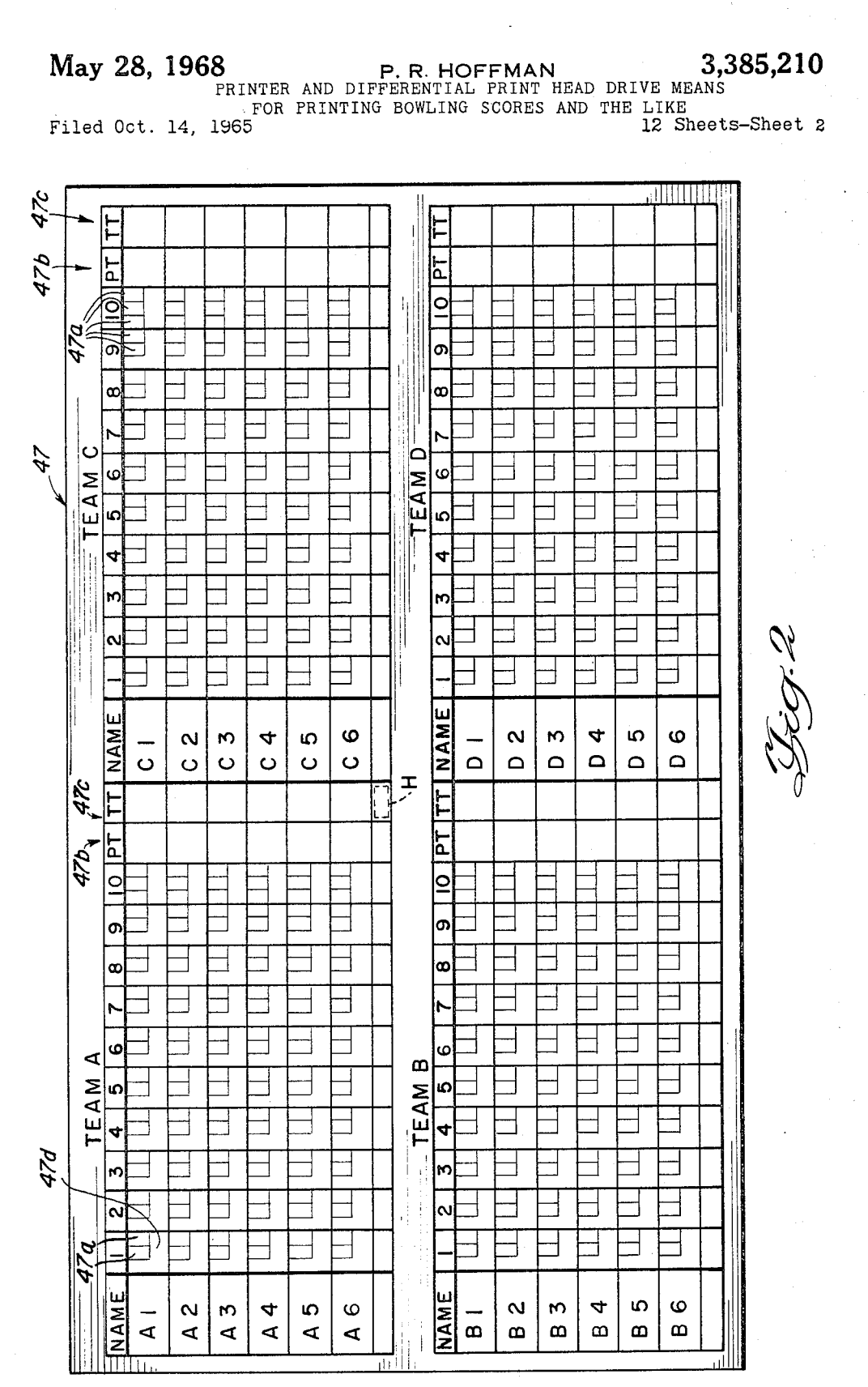

Referring generally to FIG. 1, the present bowling score printing system includes a printing mechanism 20 for printing on a scoresheet (FIG. 2). The printing mechanism includes a print head, and a print head positioning system 23 is provided for positioning the print head relative to the scoresheet which is disposed on a support surface below the print head. The print head positioning system 23 is capable of positioning the print head relative to the scoresheet in either direction from a home position H (FIG. 2) concurrently along both X and Y axes, generally normal to each other, so that the print head can be positioned directly to a frame position and bowler identity position in one operation. The print head, being moved concurrently along both axes, will travel on a diagonal generally in the direction of a vector of forces applied along or in the direction of the two axes.

Also provided is a print head operating system 24 which is capable of setting type and actuating hammers in the print head regardless of the position to which the print head has been moved relative to the scoresheet. The print head operating system and the print head positioning system are both driven by a common drive in an integrated printing operation in which the print head is first positioned to the proper frame and the bowler position, the type in the print head is set to print the proper score value and the printer hammers are then actuated to effect printing on the scoresheet.

The system of the present invention is capable of receiving information with respect to bowler identificatoin and frame identification from a calculation and control system in an automatic bowling scorer. Responsive to bowler identification and cumulative frame score vs. box score printing information, the print head is moved along a Y direction from the home position H to the proper bowler line and proper row of frame spaces 47d or boxes 47a. In response to the frame information, the print head is moved in an X direction to the left or right as viewed in FIG. 2 for printing in the proper frame, player total or team total columns. In this manner, the print head can be positioned to print in any score receiving space over the entire scoresheet.

The printing system is capable of storing the blower identification, cumulative frame score vs. box score, frame information and the actual proper score value to be printed so that the printer can effect a printing operation for printing the proper score value in the proper space of the scoresheet even after being disconnected from the source of the information, e.g., the automatic scorer. This leaves the scorer free to commence a subsequent scoring operation, e.g. for another blower on another lane, prior to completion of the present printing operation, enabling faster over-all scoring and printing.

*Positioning printing mechanism in general*

In FIG. 1, the printing mechanism, indicated generally at 20, is mounted on a frame 21 and includes a print head 22 mounted for movement in X and Y directions, a differential drive tape system 23 for moving the print head a predetermined number of units in each direction and a print head operating mechanism generally indicated at 24 for setting type in head 22, e.g. responsive to readout signals from a computation unit.

Frame 21 may be supported on suitable legs or the like. Mounted on frame 21 by brackets 25 are a pair of parallel bars 26. A carriage 27 has sleeves 28 secured thereto, slidably mounted on bars 26 and is thereby slidable along an X-axis as viewed in FIG. 1. A second pair of parallel bars 31 are carried by carriage member 27, secured at each end of each bar 31 to carriage 27. Print head 22 is slidably mounted by sleeves 33 on bars 31, slidable on bars 31 along a Y-axis.

A first print head positioning tape T–X is secured at one end by bracket 34 to the rearward side of carriage 27 for pulling carriage 27 rearward as viewed in FIG. 1 away from a generally central or intemediate home position with sleeves 28 sliding on bars 26. A cable 35 is secured to the forward side of carriage 27 by bracket 36. Cable 35 is extensible from and retractable by a spring rewind reel 37 having sufficient spring power to move carriage 27 forward along the X-axis away from the generally central home position upon release of tape T–X, and is sufficiently resilient to permit pulling of carriage 27 rearward away from home position by tape T–X.

A second print head positioning tape T–Y is secured at one end to frame 21 by bracket 38 and passes thence in order through pulley 41 rotatably mounted on carriage 27, pulley 42 rotatably mounted on print head 22, and pulley 43 rotatably mounted on carriage 27. The other ends of both tapes T–X and T–Y pass to differential tape system 23 as will be more fully described below.

Another cable 44 is secured to print head 22 by bracket 45. Cable 44 is extensible from and retractable by a spring rewind reel 46 having sufficient power to move print head 22 along the Y-axis in one direction (to the left in FIG. 1) away from home position upon release of pull on tape T–X, but is sufficiently resilient to permit pulling of print head 22 in the other direction by tape T–X away from home position. The head 22 is shown in FIG. 1 in its position furthest forward and to the left from home position.

The print head 22 is normally in home position and is moved from home position for positioning the head correctly for each desired printing operation via tapes T–X and T–Y. The print head is maintained in home position by a predetermined limited amount of tape playout from the differential tape system 23 and can be pulled from or released from home position by adjustment of the tape playout from the differential tape system 23, as will be seen. The amount of tape pulled or released by the tape system 23 determines the position of the printing head along the X and Y coordinates.

Scoresheet

A soresheet suitable for use with a printer is shown in FIG. 2, identified by reference numeral 47, and includes four separate portions, each suitable for printing a full game of a bowling team. The illustrated scoresheet is of the pressure sensitive record material type having its own ink supply and capable of producing a mark responsive to pressure. If ordinary paper is used, provision can be made to ink the printing type. The portions of the scoresheet are labeled with respect to teams A, B, C and D, and each team portion includes a sufficient number of bowler lines for six bowlers, in addition to a line along the bottom for entry of team marks or the like. Each scoresheet portion has room for entry of bowlers' names prior to use of the sheet in the present device and also includes areas for score entry for each of ten frames, player game totals 47b and team totals 47c. The team total column 47c may be used for entry of player-by-player subtotals as desired. Each score entry area for each player and for the ten frames includes a plurality of boxes indicated at 47a for entry of box scores and an area 47d below the boxes for entry of frame scores in accordance with normal score keeping practices. The scoresheet is supported face-up on support surface 48 of the platen supported by frame 21, with the top edge of the scoresheet to the left in FIG. 1. The scoresheet can be registered with register marks (not shown) on surface 48 and clipped or otherwise secured against movement. The reference letter H (FIG. 2) indicates the home printing position of the print head 22 with the scoresheet 47 properly disposed in surface 48.

Control system for positioning print head

Turning now to FIGS. 3–6, the system 23 for positioning the printing head in both X and Y directions for printing on the scoresheet includes a frame in the form of housing 51, secured against movement relative to frame 21 and having a cam shaft 52 mounted therein and therethrough for rotation by suitable bearings 53 to be driven by a chain 55 for driving a sprocket 54 pinned to shaft 52. Cam hubs 56 are mounted on shaft 52 by pins 57, each cam hub 56 having a pair of cams 58 secured for rotation therewith.

Returning to FIG. 1, chain 55 is driven by a sprocket 50 secured to a shaft 49 which is, in turn, driven by a solenoid actuated one revolution clutch 49a. Clutch 49a is in turn driven by motor M through a gear reducer G, all suitably mounted to suitable framework (not shown). Actuation of a one revolution clutch solenoid PS on clutch 49a initiates the one revolution cycle of shaft 52 (clockwise in FIG. 4), i.e. the print cycle. Solenoid PS may be actuated by a signal from a scoring system.

As seen in FIGS. 3–5, four stationary tie rods or shafts 61 are mounted between the walls of housing 51. On each shaft 61, eleven grooved rollers 62 are mounted for independent rotation by suitable bearings. Each roller 62 includes a central groove 63 (FIG. 5) for receiving and supporting or retaining slide 64 such that four rollers 62, two above and two below, are used to support and retain each slide 64 for reciprocal movement to the left and right as viewed in FIG. 3 with the slide 64 rotating the rollers 62 during movement.

Each slide 64 is normally biased to the left as viewed in FIG. 3 by a pair of tension springs 65, secured between the slide 64 and a spring mounting bracket 66 (FIG. 4) on housing 51. Each slide 64 carries a pulley 67 or 68 which is mounted through a large slot in the slide for rotation. The slides 64 are generally parallel to each other. Each pulley 67 or 68 is mounted at a position along the respective slide 64 offset from the pulley of the next adjacent slide forming a zig-zag pattern of pulleys across the array of parallel slides as best seen in FIG. 3. The print head position tapes TX and TY have one end anchored by tape anchors 71 and 72 respectively to frame 51. Each tape TX or TY extends from its anchored end about the pulleys 67 or 68 respectively to engage the furthest extent of the pulley relative to the next adjacent pulley and proceed therefrom to the next adjacent pulley and successive pulleys in last manner so that each pulley 67 or 68 is engaged by the tape TX or TY and the tape TX or TY is then directed by tape directing pulleys 73 or 74, mounted for rotation on housing 51, to the print head 22 or carriage 27 as described above.

Each of the sets of pulleys 67 or 68 on slides 64 or 65, with tape TX or TY, defines a differential unit comprising two parallel linear arrays of pulleys with the tape threaded back and forth alternately between arrays and engaging each pulley. The two linear arrays of pulleys of each unit can be considered as having an imaginary center line therebetween with the tape crossing the center line between each pulley. The first of the direction changing pulleys 73 and 74 which is tape engages after the last pulley 67 or 68 is in alignment with the array of pulleys opposite that of the last engaged pulley 67 or 68.

A cam follower roller 75 is mounted for rotation on the left end of each slide 64 as viewed in FIG. 3 and abuts one of cams 58 when cams 58 are in their rest position, as will be explained below. At the other end of each slide 64 are a pair of laterally turned flanges 76 and 77. A latch member 81 is provided for latching each slide 64 by its flange 76 against movement relative to housing 51. Each latch member 81 is slidable or telescoped on an arm 82. A spring 83 normally urges latch member 81 toward its least extended position relative to arm 82, i.e. to the position shown in FIG. 4. The arm 82 is pivotally mounted at 84 to the bracket of a magnet MX or MY (e.g. MYM2, MYP16–1, etc.) and is urged in a clockwise direction as viewed in FIG. 4 by a suitable spring 85. Magnets MX and MY are mounted to a magnet mounting plate 86 secured to housing 51.

The magnet MYM2 in FIG. 4 is illustrated in its normal energized or attracting position with arm 82 drawn against the magnet core and holding latch 81 in a latching position. It will be noted that latch 81 has a bifurcated lower edge capable of straddling flange 76 and the wall of housing 51, so that as flange 76 moves slightly to the right in FIG. 4, the latch member 81 tightly engages the outer surface of wall 51 and the inner surface of flange 76, retaining flange 76 against movement to the right in FIG. 4 relative to wall 51 even if the magnet MX or MY is thereafter de-energized. However, if the latch has been pivoted on arm 82 clockwise from the positioning of FIG. 4, i.e. by spring 85 upon de-energization of the magnet MX or MY, before flange 76 moves, flange 76 will be free to move to the right when the respective cam 58 presents its low to the roller 75.

Returning now to cams 58, the cams are configurated to present, at one point in their rotation with shaft 52, an equal high for abutting the respective rollers 75 in the position shown in FIG. 3, holding slides 64 in their home position, furthest to the right in FIG. 3, with pulleys 67 and 68 in their pair of parallel arrays.

When solenoid PS is actuated and the one-revolution clutch 49a rotates sprocket 50, sprocket 54 and shaft 52 one revolution, the cams 58 during the first half of their revolution present lows to rollers 75 which would permit slides 64 to be urged to the left by springs 65, assuming latches 81 are unlatched.

The magnets for unlatching the latches 81 are designated by coded numbers following the MX and MY designations. MX and MY designate magnets for slides which move the X and Y tapes respectively. The remainder or suffix of the magnet reference indicates the amount of movement of the slide 64 associated with the latch 81 controlled by the magnet which, upon release by the latch 81, will be permitted by rotation of the respective cam to its half revolution position presenting the cam low to the roller 75. Also in the magnet designations, plus and minus slide movement are differentiated by the letters P and M immediately following the MX and MY designations, and the next subsequent number identifies the number of units of plus or minus movement permitted by the respective cam.

A designation is also given for each cam identifying the amount of slide movement permitted by the cam low, i.e. reading from top to bottom in FIG. 3: −2, ½ of +16, −4, the other half of +16, −8 and +1 units of Y tape movement, and ½ of +15, −2, the other half of +15, −4, +1 and −7 units of X tape movement. In the case of +16 units of Y movement and in the case of +16 units of X movement, it will be noted that two cams are used for the total movement, i.e. two eight-unit cams for the Y movement and two 7.5-unit cams for the X movement.

During the sequence of operation, the magnets corresponding to the desired amount of movement of print head 22 away from home position in X and Y directions respectively are de-energized. Selected movement in a plus direction will play out tape in the differential unit while selected movement in a minus direction will pull in tape. De-energization of selected ones of the normally energized magnets is effected at the start of or before the print cycle so that, with the selected latches 81 unlatched, the respective slides 64 track the respective cams by rollers 75 under the tension of springs 65 to the half-revolution position where the roller 75 is on the cam low. The cam lows or dwells extend through most of the second half of the cycle and come abruptly to a high at the end of the cycle as the cams return to rest position. While the cams are presenting their dwells to the rollers 75, the print head is in the selected position for printing, and the printing signal is sent during the residence of the rollers on the dwells for printing in the proper selected position on the scoresheet.

Where a latch 81 is retained in latching position by its respective magnet MX or MY, the slide 64 begins to follow the dwell on its respective cam 58, but after it pulls a very slight amount, latch 81 is pulled to the right slightly as viewed in FIG. 4 against the urging of spring 83 and blocking further movement of the slide 64 by engagement of the latch 81 with flange 51. The roller 75 on the slide leaves its cam 58; and, when cam 58 completes its rotation and is returned to its rest position, it re-engages the roller 75 returning slide 64 slightly to the left (FIG. 4) and eliminating any bind of latch 81 so that latch 81 may be readily pivoted by de-energization of its respective magnet MX or MY during the next cycle.

It will be seen that each of the rollers on the slides for moving the print head in a minus direction is aligned with other minus direction slide rollers in one of the linear arrays. Also, the rollers or slides for moving the print head in a positive direction are aligned with each other in the other array. The array of pulleys for positive movement are in the array closer to the cams 58. It will be readily seen, as a positive movement pulley is carried to the left by its respective slide in FIG. 3, it pulls additional tape into the X–Y positioning device, while, as a minus pulley is moved to the left, additional tape is let out.

It will also be readily apparent from the amount of movement permitted by each pulley that the print head will be moved in a Y direction, i.e. a direction moving the head from one bowler's lane to another for each two units of movement and moving the print head from a box score printing line to a frame line or a frame printing line to the box score line for the next bowler for each one unit of direction. From its central home position H (FIG. 2), the print head can be moved anywhere from one to fourteen units in a negative direction and anywhere from one to seventeen units in a positive direction depending on the selective de-energization of the MY magnets. Thus, the amount of movement is fully adequate to position the print head in a Y direction to each bowler's box score and frame score lines of each bowler of two teams of six bowlers each, with the print head home or rest position H being at the bottom line of the upper team on the scoresheet.

Additionally, it will be seen that in an X direction, i.e. along the frames of the bowlers and assuming one printing position for each frame, the print head may be moved thirteen units in a minus direction and sixteen units in a plus direction from zero or home position H, fully adeqate to print each frame and print total player-by-player on a scoresheet having provision of entry of score for two teams next to each other when the X direction at rest or home position is in the team total column 47c of the left-hand teams (A and B) on scoresheet 47. Thus, the print head is positionable to any necessary print position over a scoresheet surface having all required print positions for handling a total of four teams.

Selective de-energization of magnets MX and/or MY results in positioning the print head 22 over the scoresheet 47 (FIG. 2) for printing in a selected score printing position.

Figure 7:
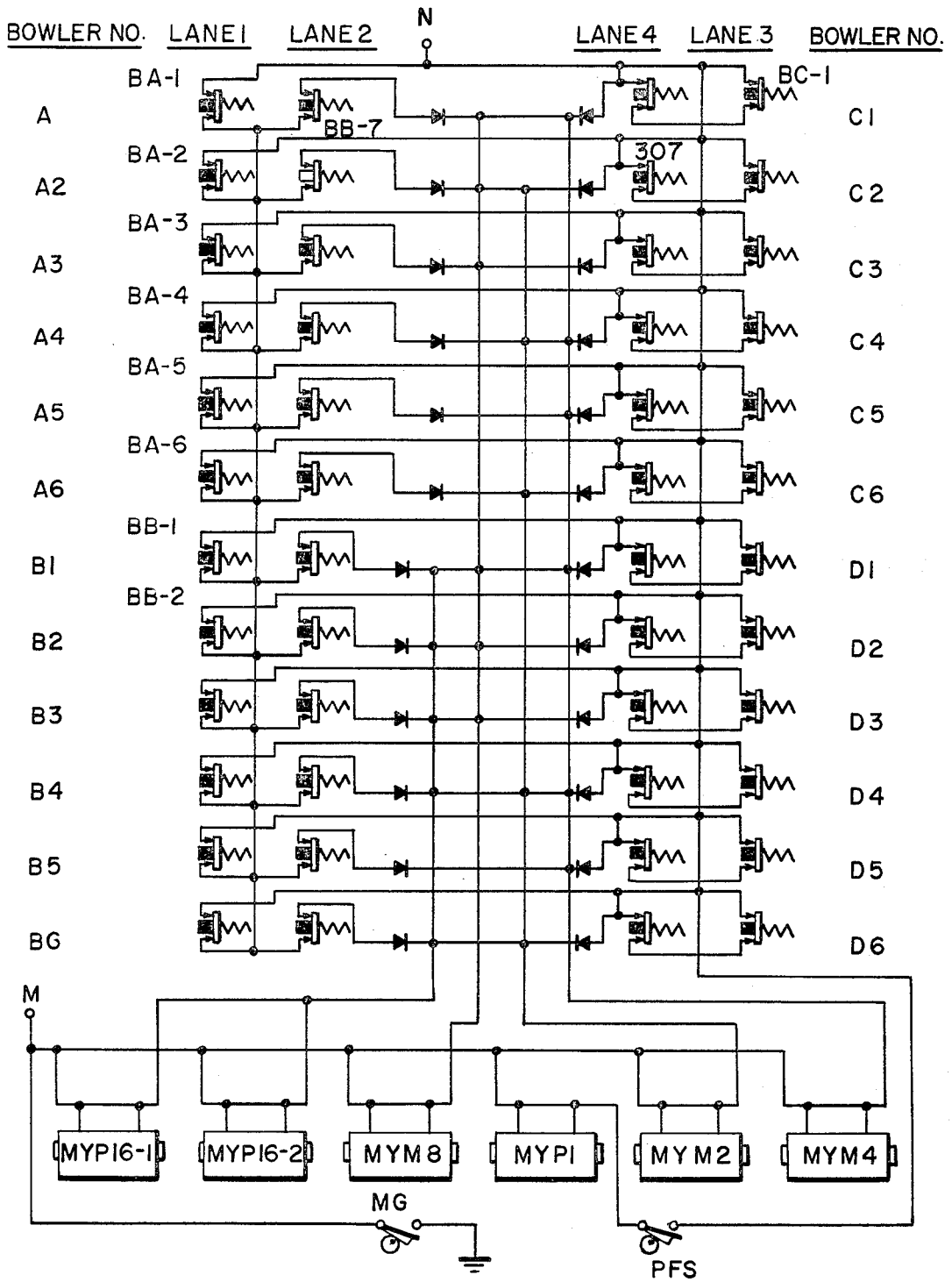
FIG. 7 is a portion of a wiring diagram of circuitry suitable for controls of the device of FIG. 1.
Figure 14:
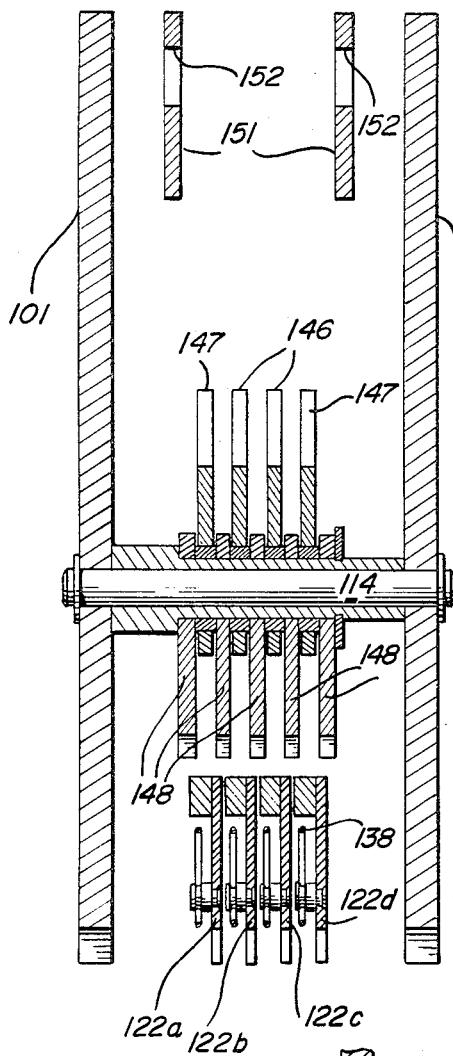
FIG. 14 is a section through the print head along line 14—14 in FIG. 11.
Figure 15:
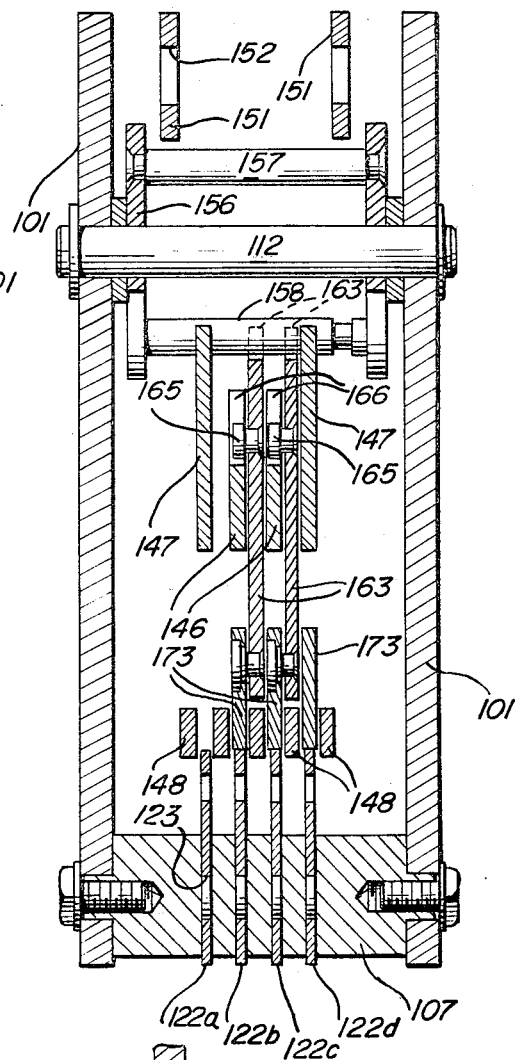
FIG. 15 is a section along line 15—15 in FIG. 11.
Figure 18:
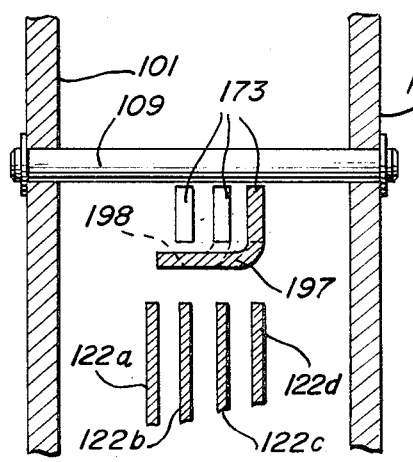
FIG. 18 is a section along line 18—18 in FIG. 11.

For positioning the print head in the Y direction, i.e. upward or downward relative to scoresheet 47 as viewed in FIG. 2, the Y tape TY is adjusted as described above. Assuming six bowlers bowling on each of four teams, the names of which bowlers may be used in lieu of the letter and number designations A1 through A6 for team A, B1 through B6 for team B, C1 through C6 for team C and D1 through D6 for team D, FIG. 7 illustrates suitable circuitry for such positioning the print head in the Y direction. In FIG. 7, each bowler, identified by bowler number, is provided with a switch for each of two lanes, assuming each bowler will alternate between two lanes during league bowling. The bowler's two switches are in series and the switches are normally closed. The bowler depresses, opens, one of his switches to de-energize the respective magnet or magnets MX in circuitry therewith. It will be seen that in each instance the appropriate magnets MY will be de-energized for positioning the print head in a vertical direction from home position H in a plus or minus direction to the proper bowler's line for printing box score in boxes 47a, assuming that each distance from one bowler's line to the next is two units. Various rows of type in the print head may be used and controlled for printing in the different positions within each frame area for a particular bowler, e.g. as more particularly described by Cornell et al. in application Ser. No. 366,297, entitled "Automatic Bowling Scorer," and filed May 11, 1964. Where it is desired to print cumulative frame score, i.e. in the frame area 47d, a computation and control unit or other means are used to close switch PFS to orient the print head an extra unit toward the bottom of the scoresheet and into space 47d. Switch PFS may be a manually operable switch if manual operation is desired for frame score print positioning.

For positioning the print head 22 in a horizontal position on the score sheet 47, a suitable wiring diagram is shown in FIG. 8. Accordingly, a printed circuit is provided having a plurality of contacts K1 and K2, contacts K1 being connected to a suitable electric source and contacts K2 being connected to the various MX magnets.

A third contact K3 is provided slidable over the surfaces of contacts K1 and K2 to complete various circuits to energize appropriate relays MXK. The MXK relays, upon energization, open relay contacts (not shown) to energize the respective magnets MX. Thus, as slidable contact K3 is adjusted vertically along the array of contacts K1 and K2, e.g. by a computer or manually, in accordance with the frame position in which printing is desired across scoresheet 47, it will be seen that the appropriate magnets MX are de-energized for moving the print head to the left or right from home position H in FIG. 2 for printing in the appropriate frame, PT or TT column, assuming one unit of movement from one frame to the next.

*Print head*

A form of print head useful in accordance herewith is illustrated in FIGS. 9–19. Referring first especially to FIGS. 9–11, the print head includes, as a frame 101, a pair of plates with a plurality of bars or pins 102 through 110 and fixed shafts 112 through 117 and rotatable shaft 118 extending therebetween and mounted thereto. Bars 102, 103, 107 and 108 function as spacer members and tie bars and secure the two plates of frame 101 in spaced parallel disposition and also include grooves for maintaining various slide members in spaced parallel disposition relative to each other while permitting the slide members to slide reciprocally to left and right, as viewed in FIGS. 9 and 11, as will be more evident hereinbelow.

Referring now to FIGS. 11–17, mounted on bars 107 and 108 are a plurality of four slide members 122a, 122b, 122c and 122d, each having slots 123 receiving spaced reduced portions of bars 107 and 108 for sliding thereon. Each of slides 122a, b and c is normally urged to the left by a spring 124 extending about a pulley 126, rotatable on shaft 116 and secured at its other end to spring anchor pin 110. Another spring 125 is secured at one end to slide 122d and at the other end to shaft 116 for urging slide 122d to the left as viewed in FIG. 11. Each slide 122 is normally held to the right by a tape 127a through 127d which extends to a typesetting control system. In general, the tape is held under tension by the typesetting control system and is released for permitting the respective slides 122 to move to the left under urging of their drive springs 124 or 125 the appropriate number of units to position desired type slugs beneath a hammer print portion at a printing station for printing from the type slugs.

Slides 122a, b, c and d carry 13, 12, 14 and 1 type slugs respectively. Slide 122c carries numerals of 0–9, a foul symbol "F," a strike symbol, a spare symbol and a split symbol "S." Slide 122a carries the same type except omitting the split symbol "S" while slide 122b carries the numerals 0–9, "F" and a strike symbol. Slide 122d carries only a numeral "1." The thousand's type slide 122d is provided with only one slug for printing only the digit "1" since this digit is the only one necessary for printing team totals scores, scores of 2000 or greater being impossible in the game of tenpins with six bowlers. The positions of the type slugs in line on each slide are indicated by the designations immediately therebelow in FIG. 11 so that each type slug on each slide having an identical symbol or number on each slide, with the slide fully withdrawn to the right, is aligned with each other identical symbol or number on the other slides. The printing ends of the type slugs are identified at 132 disposed above a hard surface 133, such as the surface of a prism, for printing on the scoresheet 47 backed by surface 133.

In FIG. 11, the printing station to which the appropriate type slugs are positioned for printing the desired symbols is immediately beneath an impact portion 134a of a hammer 134 mounted for rotation on shaft 113.

As best seen in FIG. 13, type sluge 131 are mounted between the slide 122 and a plate 135 secured to each slide 122 by suitable pins. Plate 135 includes a plurality of type receiving grooves, vertical with respect to FIGS. 11 and 13, in which the slugs 131 are vertically slidable between plate 135 and slide 122. Each slug 131 has a projection 136 which projects into a recess 137 in plate 135. Recess 137 extends the length of plate 135 and is of sufficient height to accommodate a leaf spring 138 which normally urges projections 136 and type slugs 131 upward. It will be noted that a striking force on the upper end of any of the type slugs by the hammer impact portion 134a will force the type slug, printing end downward, away from normal raised position to impress the surface of scoresheet 47 therebelow; and spring 138, held in place by a pin 139, will urge against projection 136 to return the type slug to its normal raised position.

In order to precisely align the type slugs for exact alignment of printed digits in a multi-digit score number to be printed on the scoresheet 47, a plurality of semi-crescent aligning notches 142 are provided along an upper edge of a slot 143 of each slide 122. A detent shaft 118, having a crescent cross-sectional shape, is provided for rotation into and out of the generally aligned notches 142 for more perfectly aligning the slides 122 once the slides 122 have moved into a roughly aligned position. The operation of the detent shaft 118 will be explained in more detail below.

In addition to the typesetting portion of the print head, there is also included a hammer actuating system which includes a hammer drive spring 146 for each hammer 134. Each spring 146 is a tension spring extending from a bore 144 in an upstanding portion 134c of the respective hammer 134 and is grounded at the other end on pin 106. Spring 145 is of sufficient strength to drive the hammer impact portion 134a against the type slugs for the desired printing. As seen in FIG. 13, a plurality of four hammers, one for each slide 122, is provided, each mounted for rotation on shaft, and each has its separate drive spring 145 secured in like manner.

Associated with each of the hammers 134 is a hammer trigger 146 or 147. Hammer triggers 146 are associated with the hammers for the ten's and hundred's digits slides 122b and 122c while triggers 147 are for association with the hammers for the unit's and thousand's slides 122a and 122d. Each of triggers 146 or 147 has a latching end 146a or 147a, receivable in a latch receiver 134b on the respective hammer 134. Between each hammer and trigger assembly is a hammer and trigger spacer member 148 for keeping the hammers and triggers in proper association with each other.

In the upper portion of the print head a pair of slides 151 are pinned together by pins 153 as a unit and are mounted by slots 152 for sliding on spacer bars 102 and 103 in a manner similar to the mounting of slides 122 on spacer bars 107 and 108. The slides 151 include a camming surface 151a and a cam nub 151b and are normally urged to the left as shown in phantom in FIG. 11 by a spring 159, secured between pin 153 and pin 102. A tape 154, mounted to slide 151 by mounting hook 155, extends to a hammer drive arm which is connected to a hammer control system, as will be described below. In general, during each printing operation, slide 151 is moved to the right in FIG. 11 from the position shown in phantom to that shown in full lines to effect detenting of the type, printing and recocking of the hammers, Spring 159 is then permitted to return slide 151, relatching the triggers with the hammers during the initial portion of the return stroke.

Mounted for rotation on shaft 112 is a trip lever assembly including a pair of trip levers 156 secured in spaced relation by pins 157 and 158. Levers 156 are retained in their normal rotational position as shown in full lines in FIG. 11 by a tension spring 161 extending from pin 158 to bar 105.

It will be seen that clockwise rotation of lever 156 from the position shown will engage pin 158 with trigger members 147 for pivoting latch ends 147a out of receivers 134b for printing unit's and thousand's digits. A pair of interposing arms 163, extending from a zero suppression system, to be described below, pivot about pins 164 and carry pins 165 which are received in slots 166 extending downward from the upper edges of triggers 146. With arms 163 in the raised position with their upper ends raised as shown in phantom in FIG. 15, as lever 156 is pivoted clockwise as viewed in FIG. 11, pin 158 engages the raised arms 163 which carry triggers 146 therewith to withdraw latch ends 146a from receivers 134b of hammers 134 for the ten's and hundred's slides.

Each of triggers 146 and 147 is normally urged to its clockwise or hammer latch position by a spring 168 secured through a bore 167 on the trigger and extending to a pin 171 on casing 101 or to a bore 172 in an upstanding arm of a pawl-shaped cam follower 173, each cam follower 173 being mounted for pivotal movement on shaft 115 by suitable spacer bushings 174 (FIG. 16).

In operation of the print head, after the type slides 122 have been set for printing the desired indicia, tape 154 is pulled against the urging of spring 159 to move slide 151 to the right. Lug 151b engages pin 157, pivoting lever 156 clockwise, forcing pin 158 against the upstanding portions of triggers 147 and any of arms 163 which are in the raised position with sufficient force to pivot the respective triggers 146 and 147 to disengage latch ends 146a and 147a from hammer receivers 134b, whereupon hammers 134 are driven by springs 145 against the type disposed therebelow to effect the printing operation. As slide 151 is pulled further to the right, pin 155 engages the upstanding portions 134c of hammers 134, returning hammers 134 clockwise beyond the position at which they are held by the triggers. Springs 168 have returned the triggers into engagement with the hammers.

As tape 154 is released and spring 159 drives slides 151, carrying pin 155, to the left as viewed in FIG. 11, the triggers engage latch receivers 134b to relatch the hammers. The hammers 14 move slightly counterclockwise so that latch ends 146a and 146b engage receivers 134b, to hold hammers 134 against further counterclockwise movement under the urging of springs 145. Lug 151b then hits pin 157 to pivot lever 156 counterclockwise, but lever 156 merely returns to the position shown in full lines after passage of lug 151b. Slide 151 proceeds to return to its furthest position to the left and stays until the next print operation.

A system is provided for supressing printing of zeros, i.e. "0," where needed, i.e. in all digits of a higher order than the highest order of digit to be printed. For this purpose, three cam followers 173 are provided having following ends 173a received in a dwell 196 in the upper edges of slides 122b, c and d when the respective slides 122 are in position with the type slug for printing the digit "0" directly beneath impact end 134a of hammer 134. As each of the slides is moved away from the "zero" printing position, it will be seen that cam follower end 173a will be urged by a rising edge from dwell 196 to ride upon the top of the slide 122, to be pivoting cam follower 173 clockwise on shaft 115. The cam followers 173 for following slides 122b and 122c carry pins 164 to which interposing arms 163 are pivotally mounted so that the respective arms 163 are pushed upward into the path of pin 158 each time any symbol other than zero is to be printed from the respective ten's or hundred's slide, thereby causing actuation of the respective hammer for such printing. The thousand's type has no "0" so no "0" suppression is necessary.

Provision is also made for causing the printing of zero by the ten's and hundred's slides where a higher order of digit greater than zero is also to be printed, i.e. "0" will be printed by the ten's type where a digit of 1-9 is being printed by the hundred's type or thousand's type, and "0" will be printed by the hundred's type whenever digit 1 is printed by the thousand's type. Accordingly, a flange 197 is provided on the lower edge of the cam follower 173 for the thousand's slide 122d and extends over beneath the cam followers 173 for the hundred's and ten's slides 122c and 122b. A flange 198 is provided on the lower edge of the cam follower 173 for the hundred's slide 122c and extends beneath the lower edge of the cam follower 173 for the ten's slide 122b. Thus, each time the thousand's slide 122d is positioned at the digit "1" or thereyond, its cam follower 173 pivots clockwise and lifts all cam followers 173 and raises all arms 163, causing printing of any zeros aligned by the ten's and hundred's type slides. Similarly, each time the hundred's slide 122c is moved away from the zero printing position, regardless of movement of the thousand's slide, the cam follower 173 for the hundred's slide rides upward and lifts the cam follower 173 for the ten's slide with it to raise arm 163 and cause printing of a zero from the ten's slide if a zero is disposed beneath the hammer impact end 134a.

As has been pointed out above, the type slugs are aligned by positioning of slides 122. This is done by releasing appropriate amounts of the tapes 127. The final adjustment or alignment of type position is by pivoting of detent shaft 118 into receivers 142 as already indicated. In order to pivot the detent shaft 118, a suitable linkworks is provided and actuated by camming surface 151a of the slide 151. Accordingly, a roller 181 between arms 182 is provided for following surface 151a during the reciprocal movement of slides 151. Arm 182 is secured to shaft 117 for rotation therewith, as is another arm 183. A spring 186, extending between a pin 185 and shaft 116, biases arm 183 normally in counterclockwise direction against stop pin 184. A connecting link 187 has a lost motion slot 188 receiving a pin 191 on arm 183. As spring 192 biases between pin 191 and a pin 193 on link 187 to permit limited lost motion of arm 183 relative to link 187. As seen in FIG. 9, link 187 extends downward and is connected to a crank 195 by a pivot pin 191. Crank 195 is secured to detent shaft 181 for rotation therewith.

It will be seen that while slide 151 initially moves its furthest position to the left during each print operation, roller 181 follows surface 151a pivoting arm 153 clockwise, driving link 187 downward and pivoting crank 195 and detent shaft 118 clockwise as viewed in FIG. 11 from the position shown in full lines into receivers 142 to more perfectly align the type before lug 151b trips the hammer trigger and holds the type slides detented while the hammers impact the type. Thereafter, when slide 121 returns, roller 181 proceeds back down the cam surface 151a, returning detent shaft 118 counterclockwise for disengagement with receivers 142. The type are then free to be reset during the next subsequent print operation.

*Print head operative system*

For operating the printer head 22, there is provided an operating mechanism which is indicated generally by the reference numeral 24 but which also extends by means of a plurality of operating tapes 127 and 154 to the printing head described above.

The print head control or operating mechanism (FIGS. 3, 6, 20 and 21) for setting type in the print head and for actuating the hammer is driven by cams, cam followers and tapes, from shaft 52, which rotates one revolution per print cycle in the print head positioning drive system 23.

As shaft 52 rotates through one revolution, cams 201, 202 and 203, secured to shaft 52, are also rotated through one revolution clockwise as viewed in FIG. 6. Cam followers 204 and 205 are pivotally mounted by pin 206 to frame 51 with roller ends 204a and 205a following cams 201 and 202 respectively. A strong tension spring 27 retains the roller end 204a on cam 201. Another tension spring 208 biases roller end 205a against cam 202. Cable 210 and tape 211 are secured to the other ends of followers 204 and 205. It is evident that as roller 204a proceeds into the low on cam 201, cable 210 will be pulled and as roller 205a proceeds up the rise on cam 202, tape 211 will be played out.

The tape 211 extends taut over suitable tape directing pulleys 212, mounted to suitable framework, to a type setting system (FIGS. 20 and 21) and is played out gradually as follower 205 rides up the gradual rise of cam 202. Tape 211 is attached at its other end (FIGS. 20 and 21) to a pin 213a of a bail 213 which is pivotally mounted on a pin 214 secured to frame 215. A tension spring 216 biases between an anchor pin 217 on frame 215 and pin 213a to normally bias bail 213 in a counterclockwise direction in FIG. 20.

A plurality of four ratchet sectors 221 are individually pivotally mounted in a stack on pin 214. Each of sectors 221 includes an arcuate edge having fourteen teeth 221a and a stop projection 221b at a trailing end of the arcuate array of teeth. Each of sectors 221 extends beyond pin 214 as an arm and carries a separate pulley 222 (FIG. 21), mounted for rotation. Each of sectors 221 is normally urged in a counterclockwise direction as viewed in FIG. 20 by a tension spring 223 secured between the sector 221 and a pin 217a on frame 215.

A series of magnets TS–1, TS–10, TS–100 and TS–1000 are mounted on suitable framework, one adjacent each ratchet sector 221. The magnet positions are shown in phantom in FIG. 21. Each of magnets TS has its core disposed adjacent and facing a pull plate on a latch member 224 pivotally mounted on a pin 225. Each latch member 224 includes a flanged latching end 224a for engaging the teeth 221a of a respective sector 221 and a pull plate 224b disposed adjacent the respective magnet TS for pivoting the latch member 224 counterclockwise as viewed in FIG. 20 upon actuation of the respective magnet. Each latch member 224 is normally biased by a tension spring 218 in a clockwise direction as viewed in FIG. 20. The springs 218 are secured between the respective latch members 224 and suitable spring anchor plate secured to frame 215.

At the beginning of the print cycle, followers 204 and 205 (FIG. 6) are on dwells of cams 201 and 202, respectively. As the cam follower 205 rises onto the high of cam 202, tape 211 is played out an amount permitting movement of bail 213 (FIG. 20) by spring 216 counterclockwise as viewed in FIG. 20. The playout of tape 211 is sufficient to permit ratchet member 221, abutting bail 213 at their leading edges and biased into such abutment by springs 223, to follow bail 213 through a complete sweep of each of the fourteen teeth 221a past the latching ends 224a of latch members 224 with magnets TS de-energized and the latches in a clockwise position out of engagement with teeth 221a. Thus, as tape 211 is played out slowly, the ratchet member 211 may be permitted to travel through a full sweep until projection 221b abuts the flanged latch porton 224a, whereupon any additional travel of bail 213 will not be followed by ratchet members 221.

The tapes 127 from the type slides 122a, 122b, 122c and 221d (FIG. 11) extend around suitable direction changing pulleys and around respective pulleys 222 (FIGS. 20 and 21) which are carried by respective ratchet members 221. Ratchet members 221 are, in turn, in association with latches 224 operated by respective magnets TS, i.e. the unit's tape 127a extends around the pulley 222 carried by the ratchet member 221 associated with the latch 224 operated by the unit's magnet TS–1, etc. The tapes 127 extend from pulleys 222 at their other ends, around suitable direction changing pulleys and are secured by hooks 220 to pin 106 in the print head (FIG. 11).

A commutator (FIGS. 20 and 21) is provided including a wiper arm 226 which is pivotal on shaft 214 and carries at a sweep end thereof a set of electrically interconnected contacts 227 for sweeping a printed circuit 228. The wiper arm 226 is secured, through an adjustable bolt and slot arrangement 229, to bail 213 for movement therewith. Bolt and slot arrangement 229 permits small adjustments in the relative angular disposition of wiper arm 226 and bail 213. The angular disposition of wiper arm 226 is such to complete an electrical circuit with contacts 227 between a common contact 228a and a separate one of the plurality of separate contacts 228b (in arcuate array in commutator printed circuit 228) each time a separate one of teeth 221a is disposed for engagement by the latch end 224a of the respective latch so that sweeping of the contacts 228b is directly correlated with positioning of teeth 221a for engagement by latch 224. Each unit of pivoting of each ratchet member 221, i.e. to present the next adjacent tooth to the latch member, corresponds to the amount of playout of tapes 127 required to permit the next type slug 131 to be carried by slide 122 (FIG. 11) to a position aligned with the printer hammer for printing with the printer head. Thus, the total movement of each ratchet member can be fourteen units, one unit for each indicia provided or one unit for each unit of movement for slides 122 in the printer head.

As the four ratchet members 221 pivot on pin 214, as tape 211 is played out by cam follower 205, each ratchet member will come to a position for aligning the proper digit in the print head. This proper position is detected through the commutator and appropriate circuitry for energizing the appropriate magnet TS–1, TS–10, TS–100 or TS–1000 to pivot latch 224 into the proper tooth 221a of the ratchet edge for holding the respective ratchet member 221 against further pivoting while tape 211 continues to permit movement of bail 213. Such appropriate circuitry is clearly illustrated and explained by Cornell et al. Thus, as the proper digits become positioned in the printer head for printing, the appropriate latches 224 are pulled into engagement with the teeth of ratchet members 221 to control proper alignment of the type for printing.

Cable 210 extends taut around suitable direction changing pulleys 232 and is attached at its other end by an anchor member 233 to a hammer drive arm 234 which is pivotal on shaft 214. Hammer drive arm 234 carries a pulley 235, rotatable thereon, about which tape 154 extends from the print head hammer actuating slide 151. The other end of tape 154 extends to and is secured to the print head framework in the same manner as tapes 127. Each time roller 204a (FIG. 6) proceeds down the steep fall of cam 201, spring 207 is of sufficient strength to overcome spring 159 (FIG. 11) in the print head so that arm 234 is pivoted clockwise as viewed in FIG. 20 under the urging of spring 207. This causes the hammers 134 in print head 222 to impact the aligned type. This results in printing of a score by the type as set as described above. Return of roller 204a and follower 204 overcomes spring 207 to permit spring 159 to return slide 151 to the left in FIG. 11. Follower 204 proceeds into the cam low once during each print cycle while follower 205 is already riding on the high dwell of cam 202. The low of cam 201 is configurated to cause quick movement of hammer actuating slide 151 to the right, and then the left, in FIG. 9.

Spring 207, in addition to driving print head hammer slide through the hammer tripping portion of the stroke, also provides a resilient linkage in the hammer slide drive system so that should the hammer slide jam, tape 154 or cable 210 will not receive a pulling force sufficient to break or deform them.

Follower 205 proceeds on the high of cam 202 until slide 151 returns to the left as viewed in FIG. 11. The circuitry to magnets TS is broken by a suitable control switch and, as follower 205 proceeds off the high of cam 202, the bail 213 is pulled to return ratchet members 221 clockwise, latches 224 having been disengaged by springs 218. Tapes 127 pull slides 122 to zero print position since detent shaft 118 has been pivoted out of receivers 142 by return of the hammer actuating slide 151.

The third cam 203 (FIG. 6) on shaft 52 controls a normally open switch MG in the common ground of magnets MX and MY. Switch MG is mounted to casing 51 by suitable bracket means and is closed by cam 203 shortly after initiation of the print cycle, e.g. at 10° of the cycle, and is reopened after the print head has been properly positioned along the X and Y axes, e.g. at 190° of the cycle, so that magnets MX and MY need not remain energized while the print head positioning system is not moving the print head.

As seen in FIG. 6, a normally open switch DP is mounted for actuation by cam follower 204 as the follower reaches the bottom of the low of cam 201 to give a signal, to give a momentary signal which can be sent to a computation and control unit that printing is complete so far as such computation and control unit is involved. The printer has all of the information and is able to retain the necessary information, including its proper print head position and type slide positions, while completing the printing operation. The switch DP can be included in suitable control circuitry such as that shown by Cornell et al. in application Ser. No. 366,297.

*General sequence of operation*

The printing system of the present invention, in its preferred form is conveniently timed through a sequence of operations from a common drive system. In the embodiment of the invention described above, the print cycle is initiated by actuating print solenoid PS, such as by a signal from a scoring system control after score information is available for printing. In response, shaft 52 is driven through one revolution, equivalent to a cycle of the print operation, and during the initial portion of the cycle the cams 58 move the print head 22 to its proper print position relative to the scoresheet 47, depending on printer position information received by de-energizing selected ones of magnets MX and MY. The cams 58 then function to store the proper print position as they continue to rotate and maintain the print head 22 in its print position. The input to the magnets MX and MY is no longer needed in view of the stored information with respect to print position so switch MG is opened and de-energizes magnets MX after the print head is in its proper position. De-energization of the magnets does not release additional slides 64 because they are held by latches 81. The bowler identity switches and switch PFS are also, in effect, released by breaking the circuitry to magnets MY as switch MG opens.

Three elements of storage are affected by cams 58 in that they store the proper frame information, the proper bowler identity information and information with respect as to whether printing is to be ball score printing or frame score printing.

As cam shaft 52 continues to rotate, follower 205a progresses on cam 202 to set the type. The magnets TS are momentarily energized during the sweep of bail 213 to swing the latches 224 into the proper teeth 221a, but the latches remain engaged with the teeth even after de-energization of the magnets TS because of the tension provided by springs 223. This retains the score information corresponding to the resulting type setting in the print head and also retains the type in its proper set position while releasing magnets TS.

Thereafter, follower 204a rides down the low of and back up the rise of cam 201 resulting in actuation and reset of the hammers and sending of a done-printing signal, generated at switch DP, to the scoring system so that the scoring system will be informed that the printer is available for another print operation. Follower 205a now rides down cam 202 resulting in resetting of the bail to permit return of latches 81 out of engagement with the sectors 221 as the sectors are returned by the bail. The cams 58 have begun returning the print head to its home position so that at the end of the one revolution of shaft 52 the print head is in home position. The printing system is then ready for the next cycle to be initiated by again actuating solenoid PS.

I claim:

1. A printing system for printing bowling scores on the printing surface of a scoresheet comprising a printing head mounted for movement in either of opposing directons relative to the printing surface, head positioning means including tape means attached to said head for moving said head a selected number of units relative to the printing surface, differential means for driving said tape means and moving said head in either of said opposing directions, and means controlling said differential means for producing movement of said head a preselected number of units in a preselected direction, said differential means comprising a plurality of generally parallel slides, a plurality of offset pulleys, one on each slide, sequentially receiving said tape means, and said controlling means comprises a separate latch means for each slide for holding the slide against movement, separate motor means for releasing each slide means, means moving each slide when released, and means limiting the movement of each slide when released to a predetermined distance.

2. A printing system for printing bowling scores on the printing surface of a scoresheet comprising a print head mounted for movement relative to the printing surface in opposite directions along X and Y axes generally normal to each other, first head positioning means including differential means attached to the head for moving the head a selected number of units relative to the printing surface along the X axis, second head positioning means including differential means attached to the head for moving the head a selected number of units relative to the printing surface along the Y axis, common drive means for driving said first and second differential means for producing compound movement of the head along both axes, and control means associated with said common drive means for controlling position of the head by said drive means a preselected number of units in a preselected direction along both said axes, said control means comprising a plurality of separate inputs and a common output to each of said differential units and separate means for actuating each of said inputs, and including means normally biasing each of said inputs toward engagement with said drive means and means normally retaining each of said inputs disengaged from said drive means and wherein said separate actuating means comprises means for releasing selected retaining means to release the respective input means for engagement with said drive means.

3. A system for printing bowling scores on a scoresheet having a box score space and a cumulative frame score space, which system comprises first operative storage means for receiving and storing frame information from a source of frame information, second operative storage means for receiving and storing bowler identification information from a source of bowler identification information, third operative storage means for receiving and storing cumulative frame score printing space information and box score printing space information from a source of printing space information, fourth operative storage means for receiving and storing score information from a source of score information, means for printing score values, means for positioning said printing means relative to a scoresheet, and common drive means for driving said positioning means and for all of said storage means to position said printing means to the proper space on said scoresheet responsive to stored information of said first, second and third storage means and for actuating said printing means to receive and print information from said fourth storage means, each of said storage means holding stored information after disconnect from the sources supplying said information thereto whereby said printing system is operated to perform a printing operation from stored information independent of such supplying means after disconnect.

4. A printing system for use in combination with a scoring device for scoring bowling games wherein the scoring device comprises a source of bowler identification information, frame information, score information for a score value to be printed, and information of the space into which the score value is to be entered or printed on a scoresheet having a box score space and a cumulative frame score space for each frame of a bowling game, which system comprises means for receiving and storing frame information for the scoring device, means for receiving and storing bowler identification information from the scoring device, means for receiving and storing cumulative frame score printing space information and box score printing space information from the scoring device, means for receiving and storing score information from the scoring device, means for disconnecting the receiving and storing means from the scoring device, means for printing a score value, means for positioning said printing means relative to a scoresheet, and common means for actuating said positioning means and printing means to print stored score information in the proper space on said scoresheet responsive to stored frame information, stored bowler identification information, stored box score printing space information and stored cumulative frame score printing space information in said receiving and storing means, means in each of said receiving and storing means for holding said information after disconnection from the scoring device supplying said information whereby said printing system is adapted to perform a printing operation independent of such scoring device after having received the information.

5. In a printing system for printing bowling scores on a scoresheet wherein the scoresheet is supported on a support surface secured to a frame and a printing head is mounted for movement relative thereto along X and Y axes for printing thereon, said head including type mounted for movement to a printing station and a hammer movable to strike said type at said station for printing, and separate cable means for moving said head, said type and said hammer, the improvement which comprises separate cam means for controlling each of said cable means, and common drive means for driving said cam means to control said cables for moving said head along said axes, moving said type to said station and moving said hammer to strike said type.

6. A printing system for printing bowling score information on a scoresheet comprising a printing head having a frame, a plurality of arrays of spaced type members each including a plurality of type elements, slide means slidably mounted on said frame and mounting each array of type elements in said head for individual movement to move a selected one of the type elements of the array to a printing station adjacent the scoresheet, hammer means mounted for movement for striking type at said station for printing on the scoresheet, means for actuating said hammer means to print, detent receiver means in each slide for each type element spaced along the slide according to the spacing of the type elements in the array, a detent shaft rotatably mounted to said frame, means for moving each of said arrays, and means responsive to said actuating means for pivoting said detent shaft into aligned receivers on said slide for holding said slides in proper alignment during printing by said hammer means.

7. An apparatus for printing bowling score information on a scoresheet comprising a printing head, a plurality of arrays of type elements, each array including a plurality of type elements with the array mounted in said head for movement of any selected one of the type elements of the array into a printing station adjacent the scoresheet, hammer means mounted for movement for striking type at said station for printing on the scoresheet, trigger means for said hammer means for blocking movement of said hammer means and movable to a position unblocking said hammer means, a hammer actuating slide mounted for reciprocal movement, means for moving said hammer actuating slide through a reciprocal path away from and toward a home position, lever means for tripping said trigger means, and means on said hammer actuating slide for moving said lever means to trip said trigger means responsive to movement of said hammer actuating means in said reciprocal path.

8. The apparatus of claim 7 including means for moving said trigger means out of tripping association with said lever means for suppressing printing from a predetermined one of said arrays responsive to a condition determined by the positions of said arrays.

9. An apparatus for printing bowling score information on a scoresheet comprising a printing head having a frame, a plurality of arrays of type elements, each array including a plurality of type elements, slide means mounting each array of type elements on said frame for individual movement to move a selected one of the type elements of each array into a printing station adjacent the scoresheet, hammer means for each type slide means mounted on said frame for movement for striking type of the respective type slide at said station for printing on the scoresheet, trigger means for said hammer means for blocking movement of said hammer means and movable to a position unblocking said hammer means, tripping means for tripping said trigger means, a hammer actuating slide mounted on said frame for reciprocal movement, resilient means biasing said hammer actuating slide in one direction toward a home position, means for moving said hammer actuating slide against said resilient means in the other direction away from home position, means on said hammer actuating slide for engaging said tripping means, means to trip said trigger means to unblock the hammer means for striking the type and means on said hammer actuation for thereafter resetting said hammer and trigger means to block said trigger on each reciprocation of movement of said hammer actuating slide away from home position and return.

10. The apparatus of claim 9 wherein said tripping means comprises lever means pivotally mounted on said frame for movement into and away from engagement with said trigger means and cam means on said hammer actuating slide for driving said lever into engagement with said trigger means during said stroke.

11. The apparatus of claim 10 wherein said type slides include separate type slides carrying type for unit's, 10's, 100's and 1000's digits and the 10's and 100's type slides each include type for printing the digit "0," including separate pawl means for feeling each of the 10's, 100's and 1000's digits type slides in zero printing position, and means responsive to said pawl means for removing the trigger from the lever path for the 100's hammer responsive to both the 100's and 1000's type slides in zero printing position and removing the trigger from the lever path for the 10's hammer responsive to all of the 10's, 100's and 1000's type slides in zero printing position.

12. An apparatus for printing bowling score information on a scoresheet comprising a printing head, a plurality of arrays of type elements, one array for each digit of a different order of magnitude in the score to be printed and each array including a plurality of type elements including a type element for printing "0" in at least one of said arrays, slide means mounting each array of type elements in said head for individual movement to move a selected one of the type elements of the array into a printing station adjacent the scoresheet, hammer means mounted for movement for striking type at said station for printing on the scoresheet, feeler means following said slide means for detecting the positions of each slide carrying type for printing a digit of a number higher than the unit's digit, and means responsive to said feeler means for suppressing printing of zeros from each array of type having a zero and of a higher order of magnitude than the highest order of magnitude non-zero moved to said station for printing.

13. In a system for printing bowling scores including printing means having type mounted for adjustment to each of a plurality of adjusted type positions for printing bowling game score information at a printing station and movable means for adjusting the type to each position, in combination therewith means for receiving score information to be printed and defining a reference scale adjacent said movable means having a separate value station thereon corresponding to each value of score information printable by said printing means with the type adjusted in each position, means carried by said movable means during type adjusting movement thereof for comparing the adjustment of the type to each position with the corresponding value station of said receiving means, and means responsive to coincidental compared type position and receiving means station for stopping the type in its adjusted position.

14. A printing system for printing bowling scores comprising a printing head having type mounted for movement to a printing station, trackable readout means for receiving an indication of the desired number to be printed, means for tracking said readout means for detecting the digits of the numeral to be printed, bail means mounted for movement with said tracking means, type positioning members, one for each digit of the number to be printed, means mounting said type positioning members for independent movement in abutment with and following said bail means, separate means for stopping each of said type positioning members from following said bail during movement of said bail and for holding the type positioning members against movement in positions corresponding to the identity of the digits of the number to be printed, and means for moving type to the printing station for printing the number responsive to the stopped position of said type positioning members.

15. A printing system for printing bowling scores on a score sheet, which system comprises a support surface for supporting the score sheet, means for printing score values, means mounting said support surface and printing means for relative bodily movement in opposite directions from a home position along transverse straight X and Y axes, score information receiver means including means for receiving frame designation and means for receiving bowler identification, and drive means for producing relative movement along one of said axes responsive to said frame designation receiving means and concurrently along the other of said axes responsive to said bowler identification receiving means for aligning said printer head and support surface for printing in a proper position on said score sheet.

16. A printing system for printing bowling scores on a score sheet, which system comprises a support surface for supporting the score sheet, means for printing score values, means for setting type in said printing means, means mounting said support surface and printing means for relative movement in opposite directions from a home position along both X and Y axes, score information receiver means including means for receiving frame designation and means for receiving bowler identification, and common drive means for driving said type setting means and producing relative movement along one of said axes responsive to said frame designation receiving means and concurrently along the other of said axes responsive to said bowler identification receiving means for aligning said printer head and support surface for printing in a proper position on said score sheet.

17. A printing system for printing bowling scores on a score sheet, which system comprises a first source of printer position information, a second source of score information, means for receiving and storing printer position information from said first source, means for receiving and storing score information from said second source, connecting means for connecting said receiving means to their respective sources, printer means for printing score information, means mounting said printer means for movement relative to a score sheet, means for moving said printer means, means for setting type in said printer means, means for actuating said printer moving means to position said printer means relative to the score sheet in the proper space on the score sheet responsive to stored printer position information and for actuating said type-setting means to set the proper type responsive to stored type-setting information, and including means for holding said printer in position and said type set after disconnect from the source of supplying information thereto.

18. The system of claim 3 wherein said third operative storage means comprises means for adjusting information from said second operative storage means controlling said drive means to change the drive means response responsive to the distinction between cumulative frame score and box score signals.

19. The printing system of claim 4 wherein said holding means comprises means holding a proper type element in said printing means at a printing station.

20. The printing system of claim 15 wherein said score information receiver includes means for receiving bowler team identification.

21. The printing system of claim 14 including a score sheet means on said supporting surface, said score sheet means having a plurality of team areas including first and second team areas each having an array of frame score entry strips, each strip extending in a first direction and being disposed in order in its array in a second direction transverse to said first direction, said first and second team areas being disposed adjacent each other in said second direction and wherein said drive means produces relative movement along the axis corresponding to said second direction responsive to both frame designation and bowler team identification in said score information receiver means.

22. The printing system of claim 21 wherein said score sheet includes third and fourth team areas similar to said first and second team areas disposed adjacent each other in said second direction and adjacent said first and second team areas in said first direction, and wherein said drive means produces relative movement along the axis corresponding to said first direction responsive to bowler identification and team identification information in said score information receiver means.

References Cited

UNITED STATES PATENTS

| | | | |
|---|---|---|---|
| 723,567 | 3/1903 | White | 197—55 |
| 1,078,081 | 11/1913 | Baker | 197—12 |
| 2,661,683 | 12/1953 | Beattie | 101—93 |
| 2,905,301 | 9/1959 | Bonner | 197—49 |
| 2,905,302 | 9/1959 | Hickerson | 197—52 |
| 3,124,355 | 3/1964 | Mentzer et al. | 101—93 |
| 3,247,789 | 4/1966 | Webb et al. | 101—93 |
| 3,289,574 | 12/1966 | Webb | 101—316 |

FOREIGN PATENTS

| | | |
|---|---|---|
| 464,357 | 4/1937 | Great Britain. |

WILLIAM B. PENN, *Primary Examiner.*